United States Patent
Yanagawa et al.

(10) Patent No.: US 7,852,726 B2
(45) Date of Patent: Dec. 14, 2010

(54) RECORDING APPARATUS AND RECORDING MEDIUM, AND COMPUTER PROGRAM

(75) Inventors: Naoharu Yanagawa, Saitama (JP); Akira Shirota, Saitama (JP)

(73) Assignee: Pioneer Corporation, Tokyo (JP)

( * ) Notice: Subject to any disclaimer, the term of this patent is extended or adjusted under 35 U.S.C. 154(b) by 484 days.

(21) Appl. No.: 11/918,345

(22) PCT Filed: Apr. 13, 2006

(86) PCT No.: PCT/JP2006/307826
§ 371 (c)(1),
(2), (4) Date: Dec. 19, 2007

(87) PCT Pub. No.: WO2006/112352
PCT Pub. Date: Oct. 26, 2006

(65) Prior Publication Data
US 2009/0052302 A1 Feb. 26, 2009

(30) Foreign Application Priority Data
Apr. 13, 2005 (JP) .............................. 2005-115518

(51) Int. Cl.
*G11B 7/00* (2006.01)
(52) U.S. Cl. ............. 369/53.22; 369/53.23; 369/124.03
(58) Field of Classification Search .............. 369/53.22, 369/44.37, 112.01, 112.02, 112.1, 94, 53.2, 369/44.41, 44.42, 53.23, 124.03, 124.12, 369/53.11, 53.31, 53.28
See application file for complete search history.

(56) References Cited
U.S. PATENT DOCUMENTS 6,327,237 B2 * 12/2001 Yanagawa et al. ...... 369/112.19
6,385,158 B1 * 5/2002 Takagi et al. ........... 369/112.16
6,879,555 B2 * 4/2005 Takeuchi ................. 369/53.23
7,016,271 B2 * 3/2006 Kobori ..................... 369/44.26
2002/0003755 A1 1/2002 Fujita et al.

FOREIGN PATENT DOCUMENTS

| JP | 64-66624 A | 3/1989 |
|---|---|---|
| JP | 4-121829 A | 4/1992 |
| JP | 9-282684 A | 10/1997 |
| JP | 11-96575 A | 4/1999 |
| JP | 2002-25082 A | 1/2002 |
| JP | 2004-310840 A | 11/2004 |

OTHER PUBLICATIONS

"Optical Head for Magneto-optical Disk," Elec. Mat., vol. 27, No. 7, pp. 73-74 (Jul. 1, 1988) (with translation).

\* cited by examiner

*Primary Examiner*—Nabil Z Hindi
(74) *Attorney, Agent, or Firm*—Young & Thompson

(57) ABSTRACT

A recording apparatus includes: a recording device for recording data onto each of a plurality of types of recording media by irradiating a light beam corresponding to each of the types of recording media; a diffracting device disposed on an optical path of the light beam from the recording device to the recording medium, for generating a main beam and a plurality of sub beams by diffracting the optical beam, the main beam recording data and performing a tracking process, the sub beams performing the tracking process, an amplitude of a tracking signal generated by each or one portion of the sub beams and by the main beam being maximum; a controlling device for controlling the diffracting device to adjust a position on which each of the plurality of sub beams is focused, in accordance with the type of the recording medium; and a tracking device.

19 Claims, 21 Drawing Sheets

[FIG. 1]
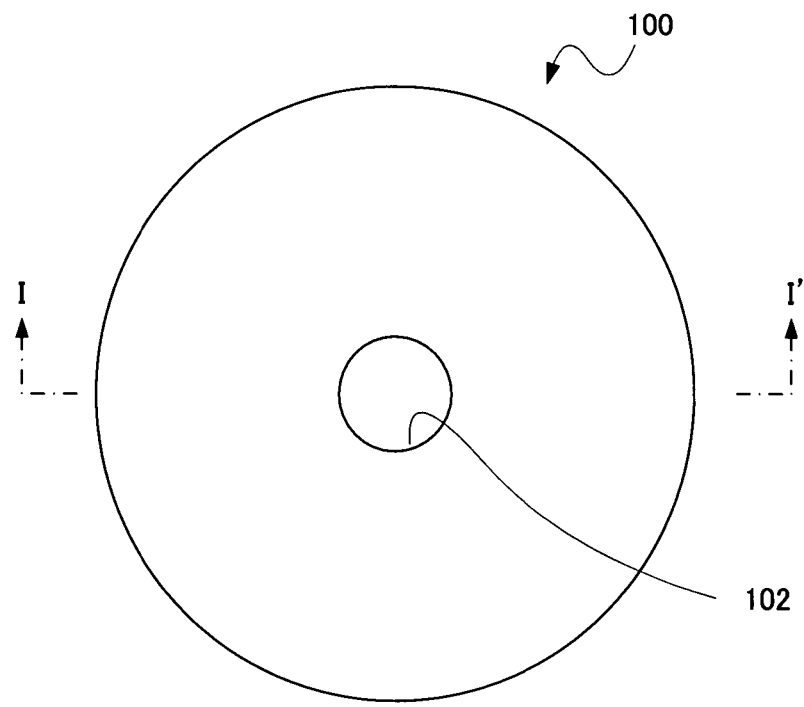
(a)
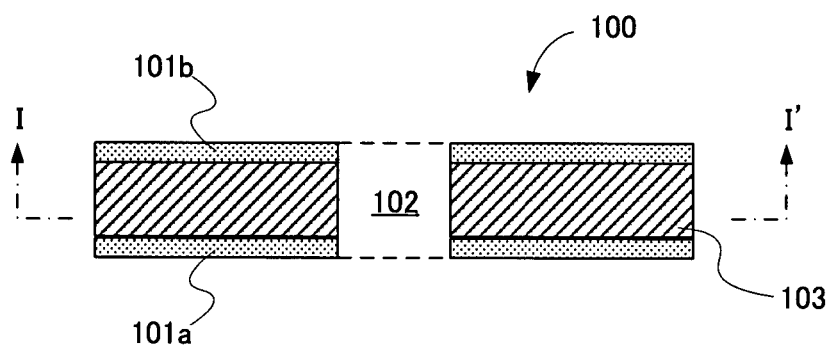
(b)

[FIG. 2]
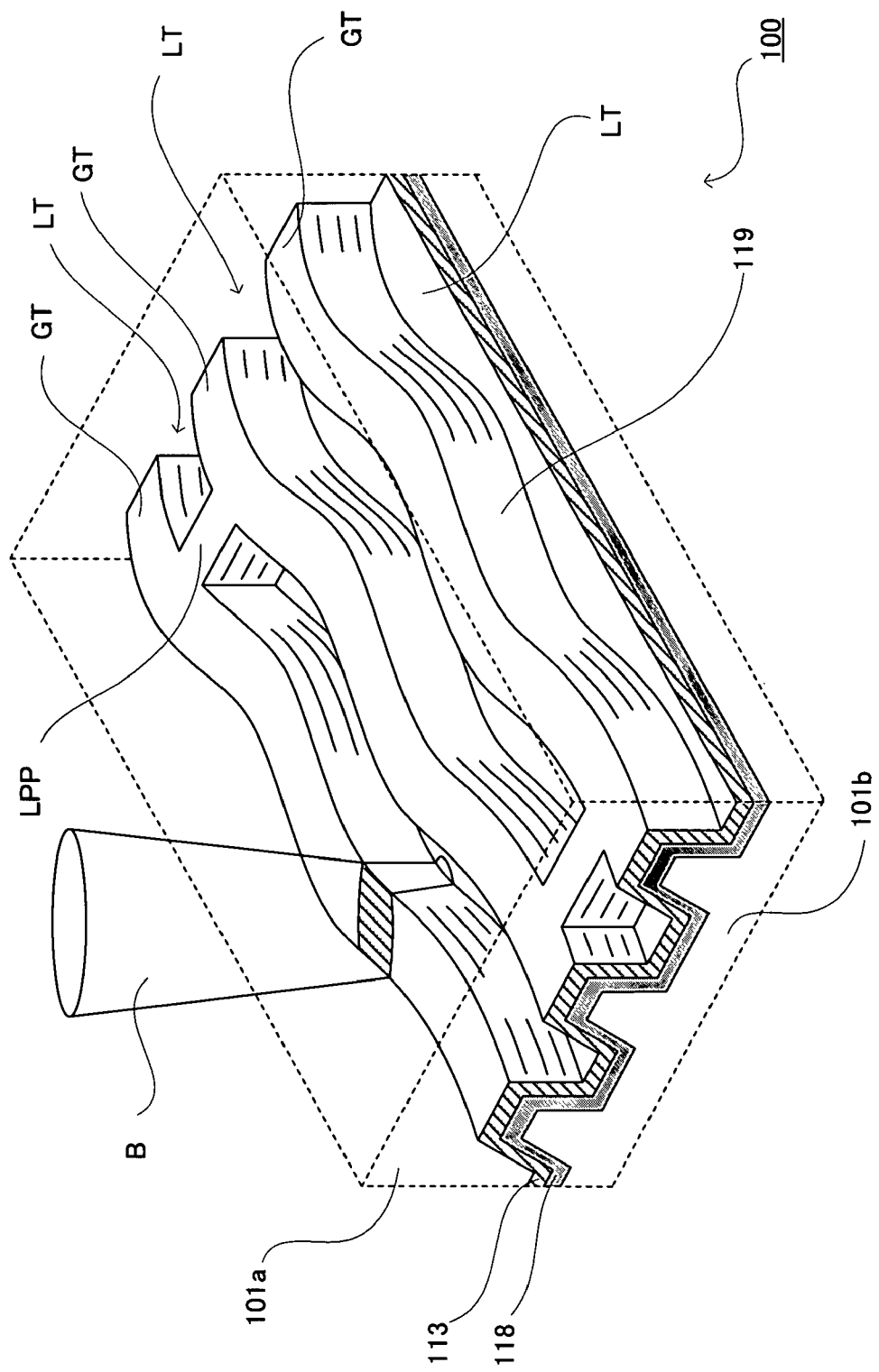

[FIG. 3]
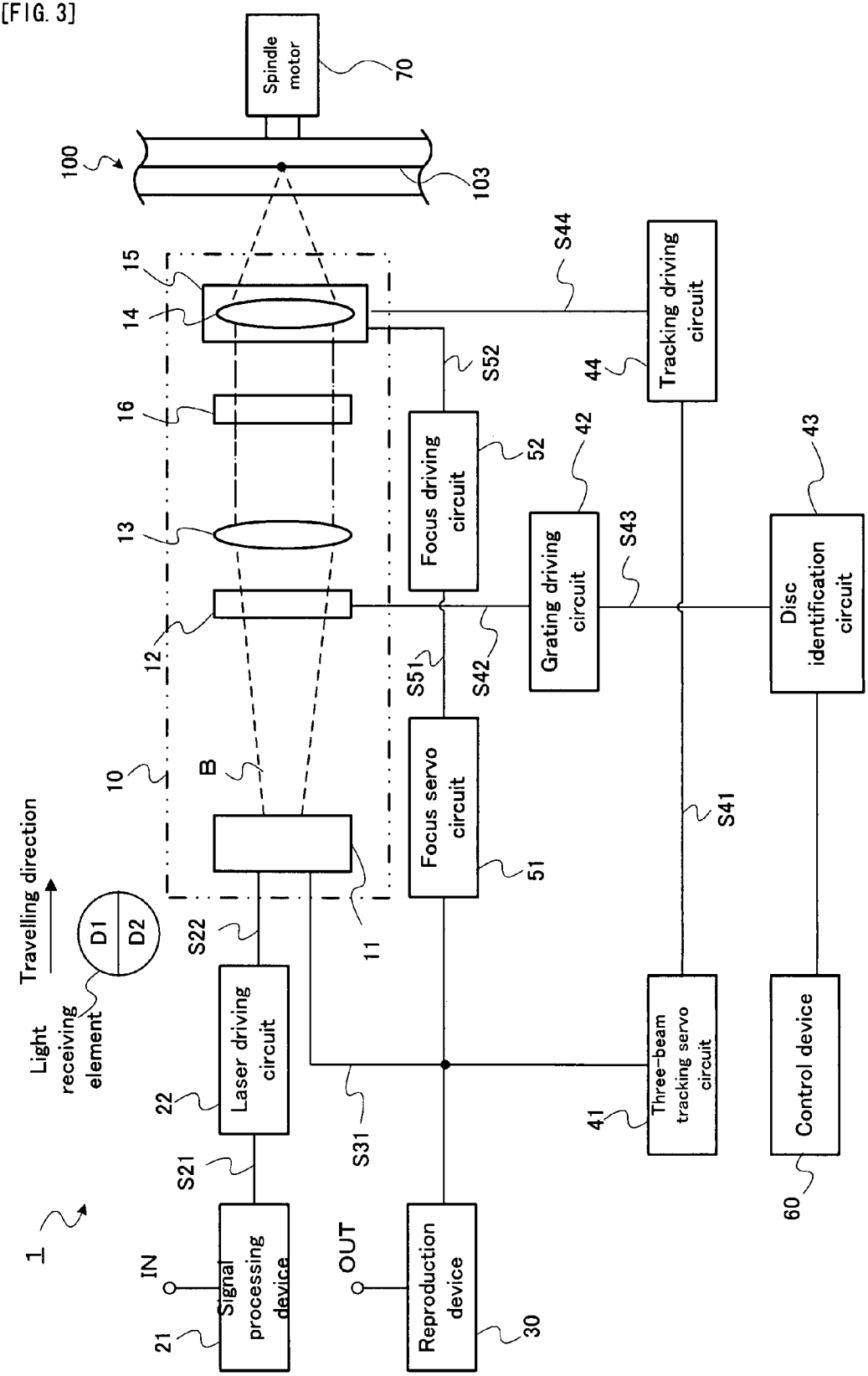

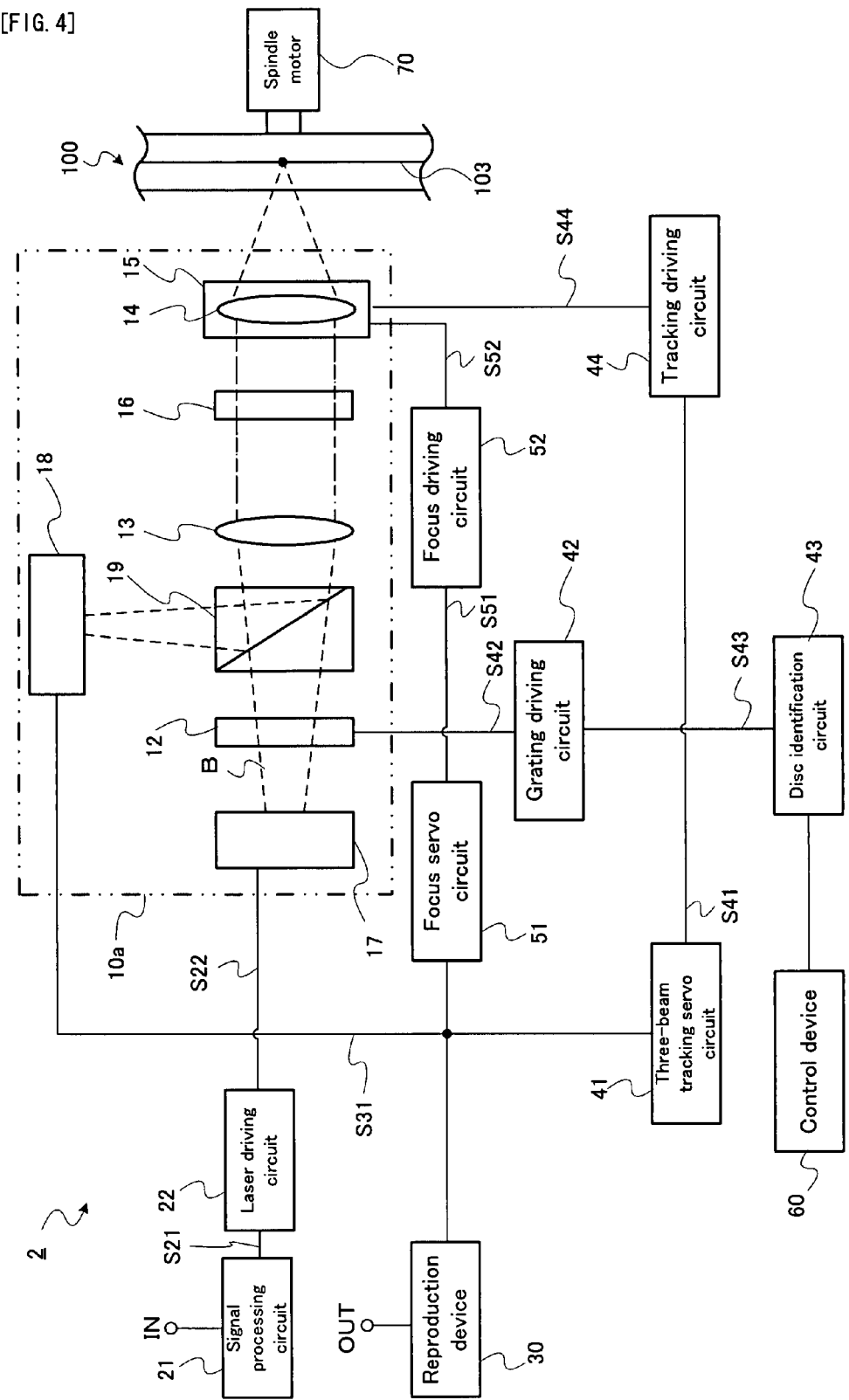
[FIG. 4]

[FIG. 5]
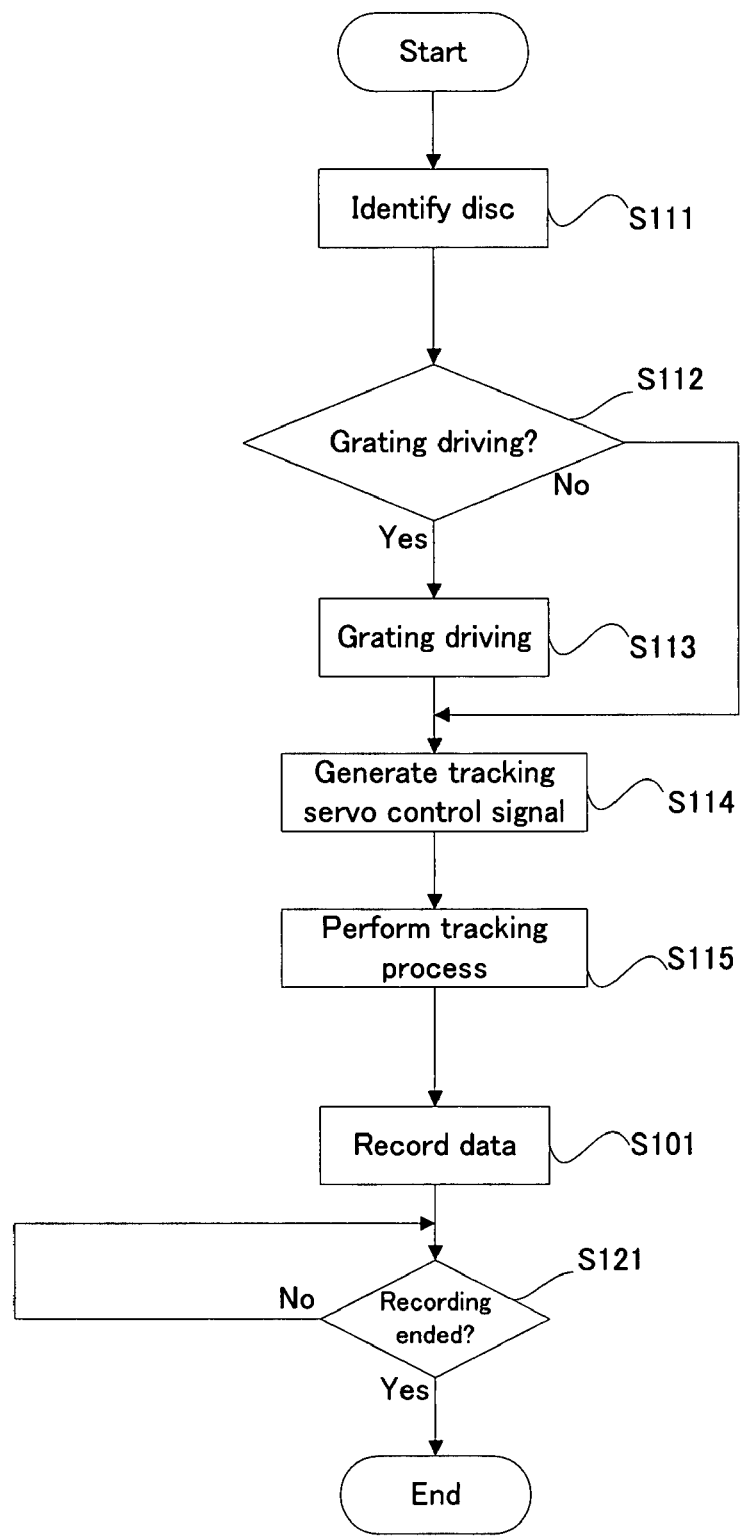

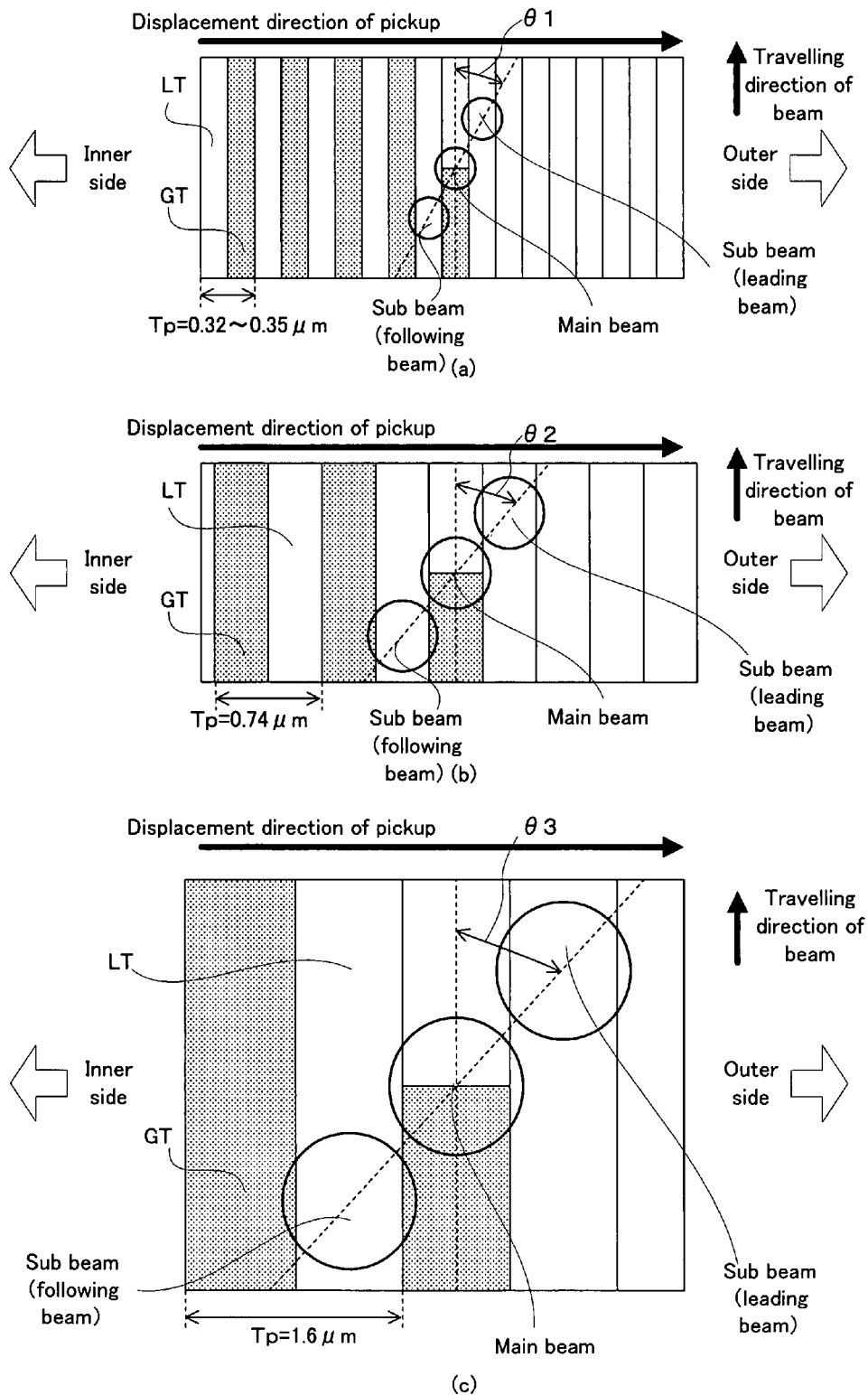
[FIG. 6]

[FIG. 7]
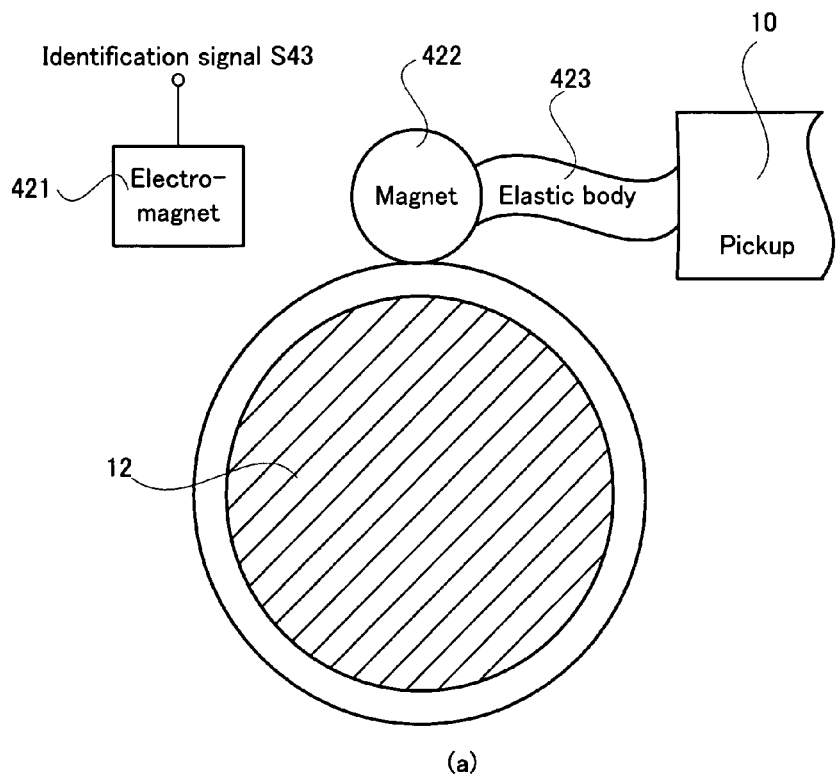
(a)
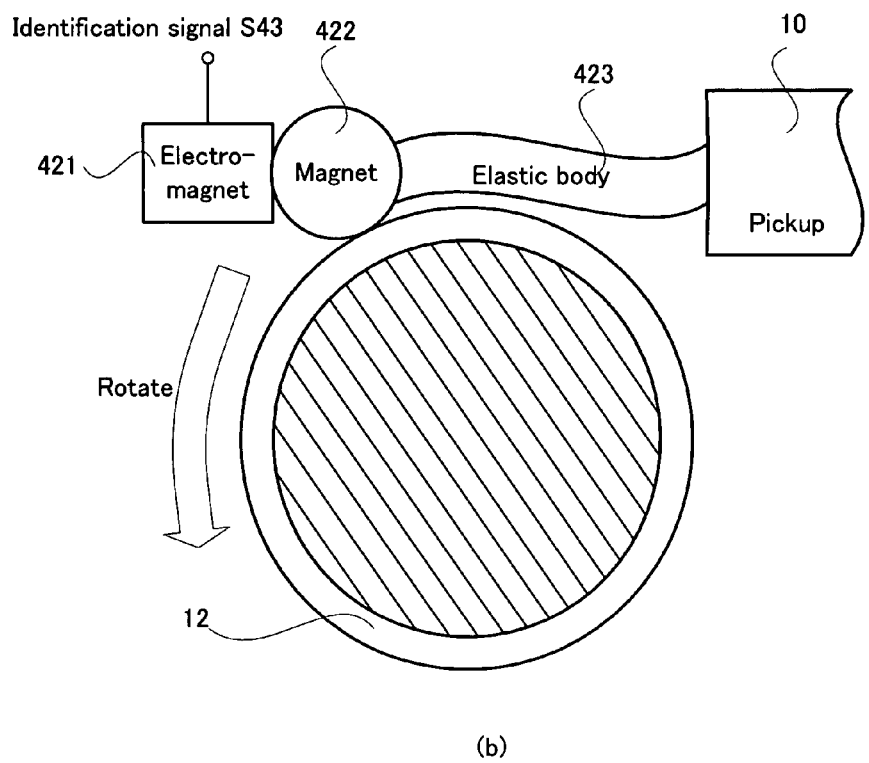
(b)

[FIG. 8]
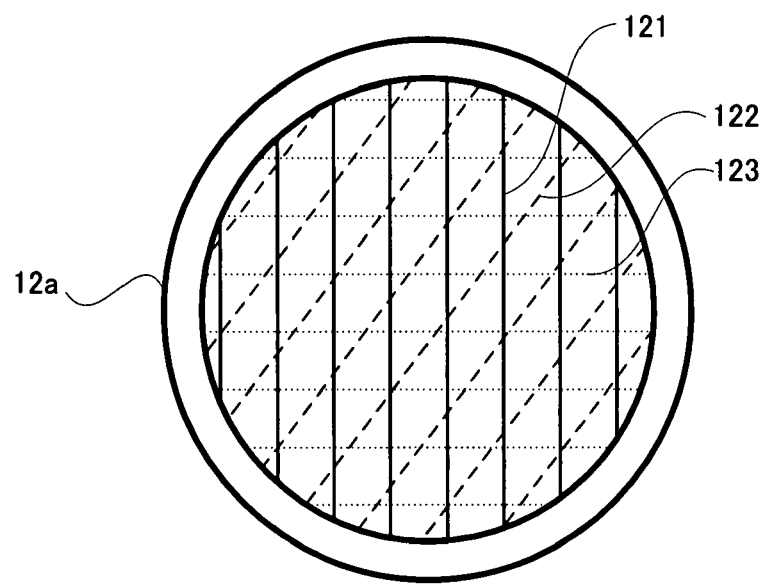
(a)
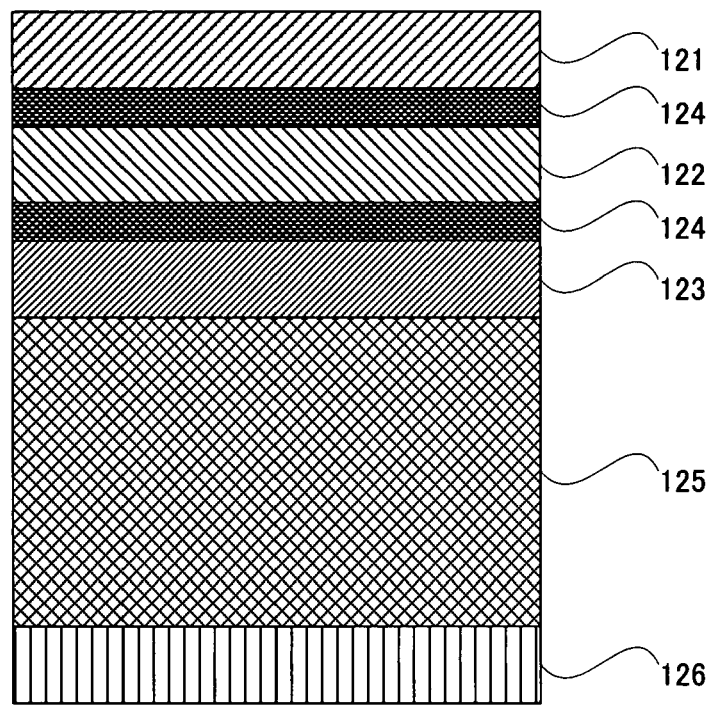
(b)

[FIG. 9]
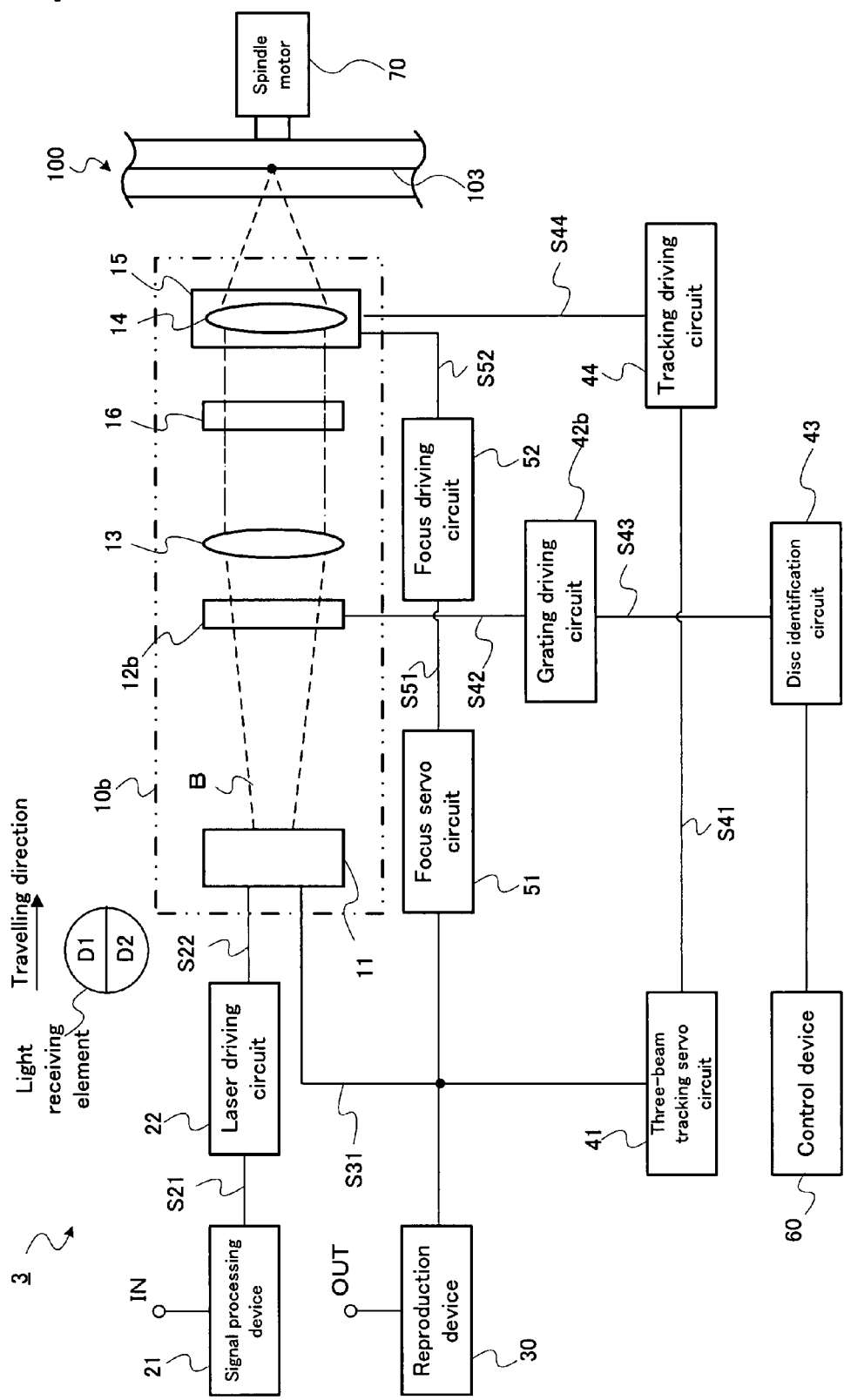

[FIG. 10]
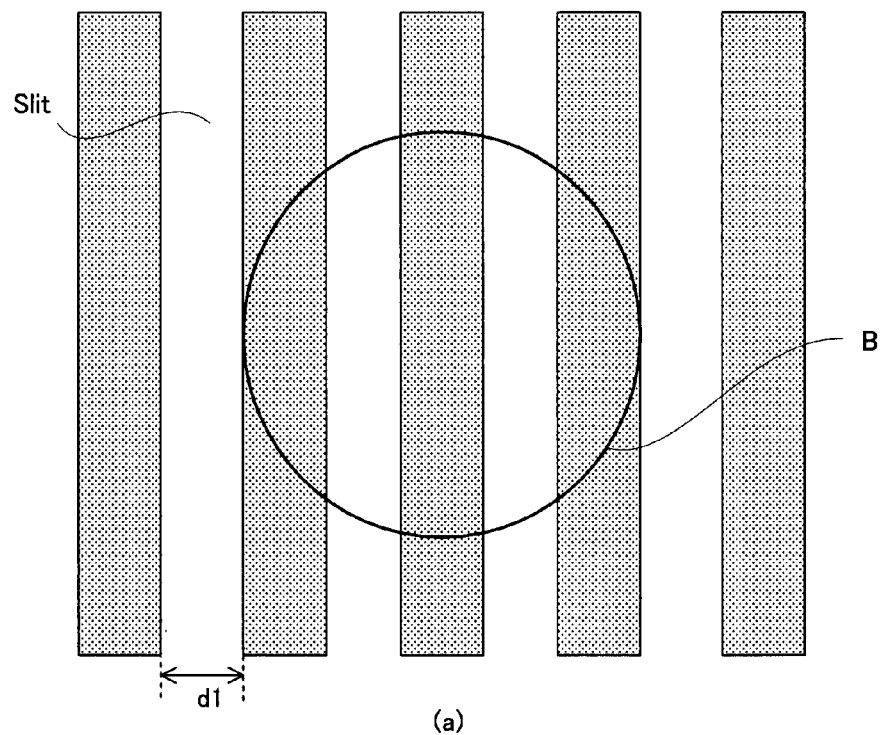
(a)
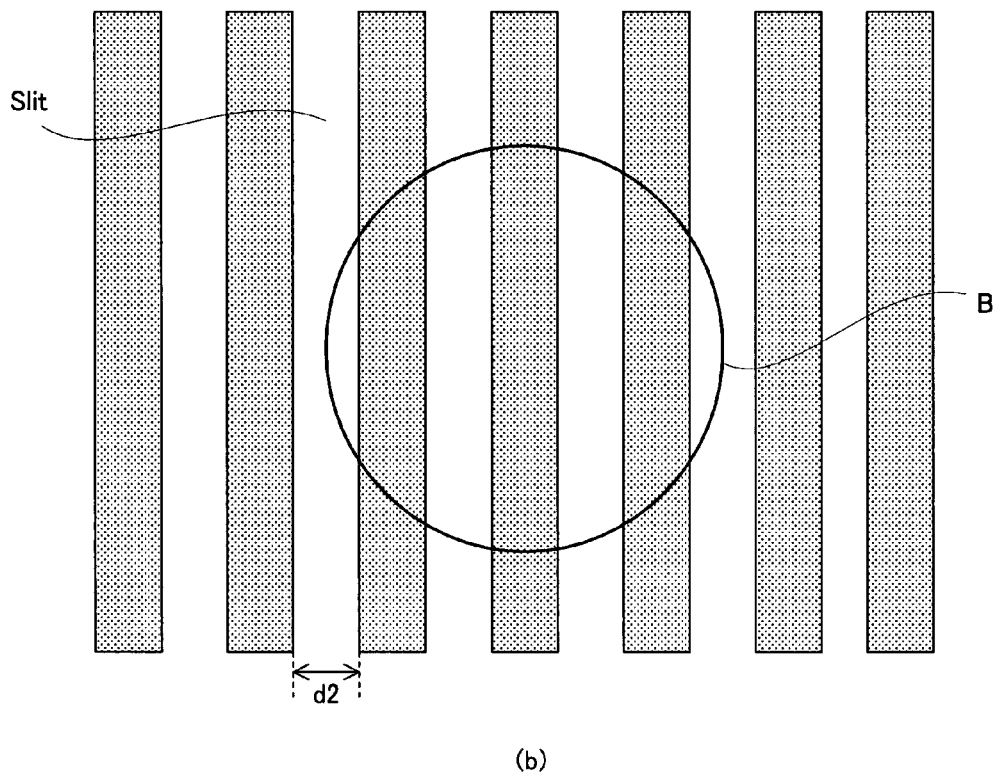
(b)

[FIG. 11]
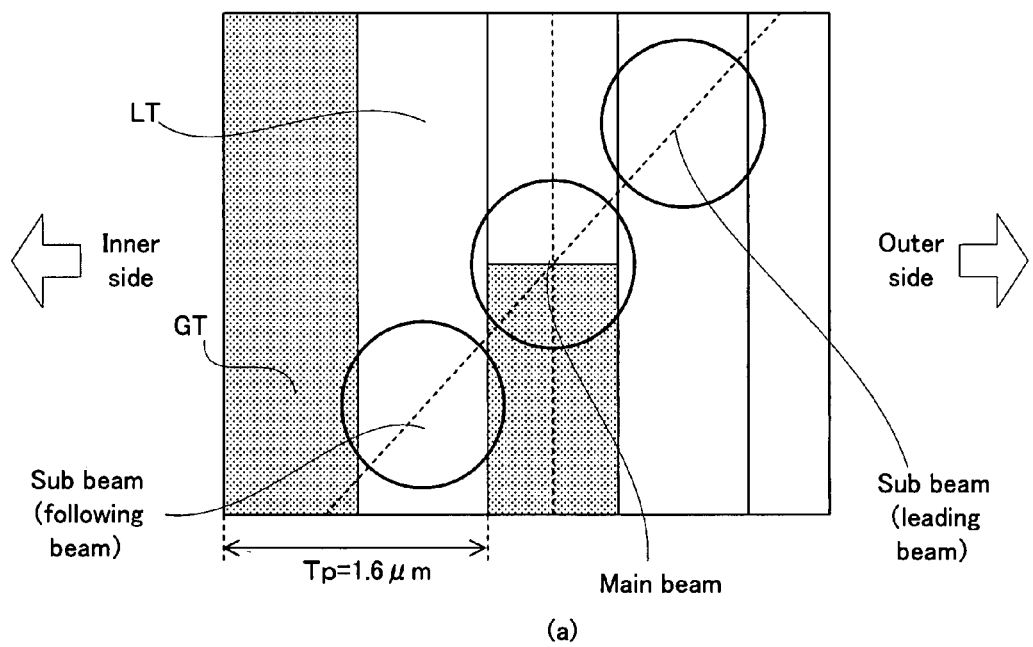
(a)
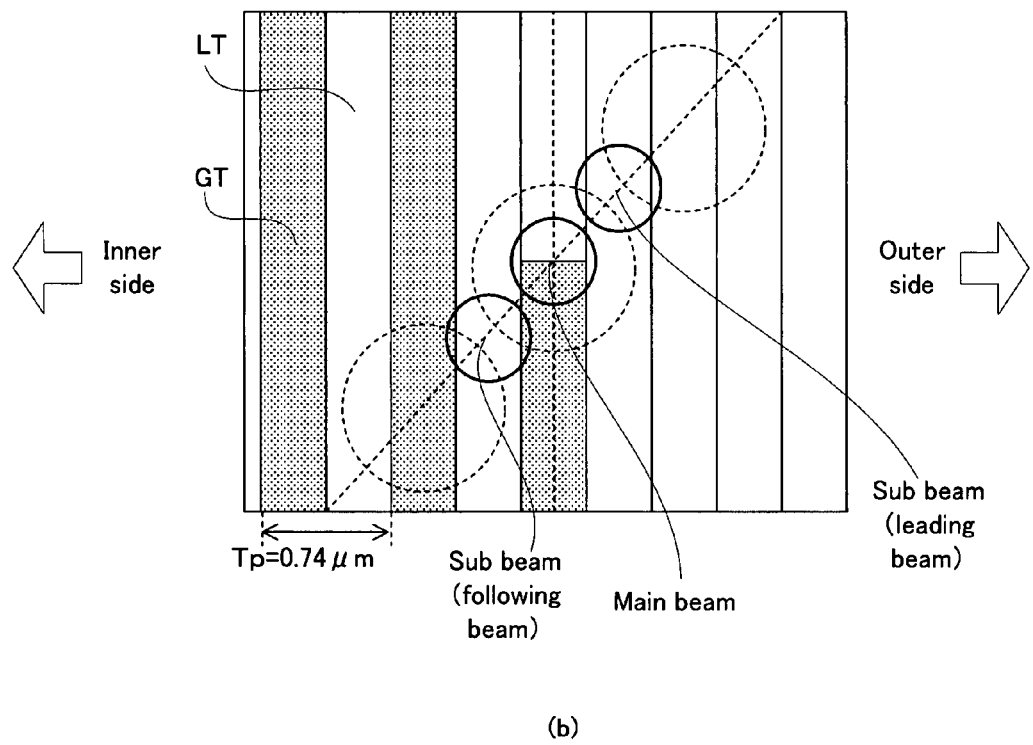
(b)

[FIG. 12]
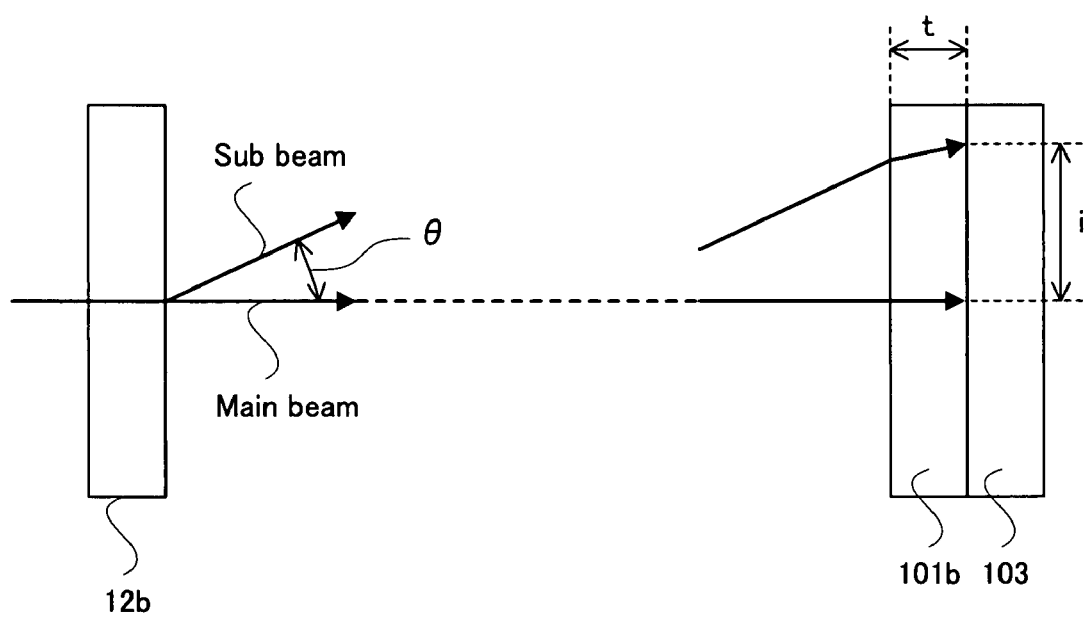

[FIG. 13]
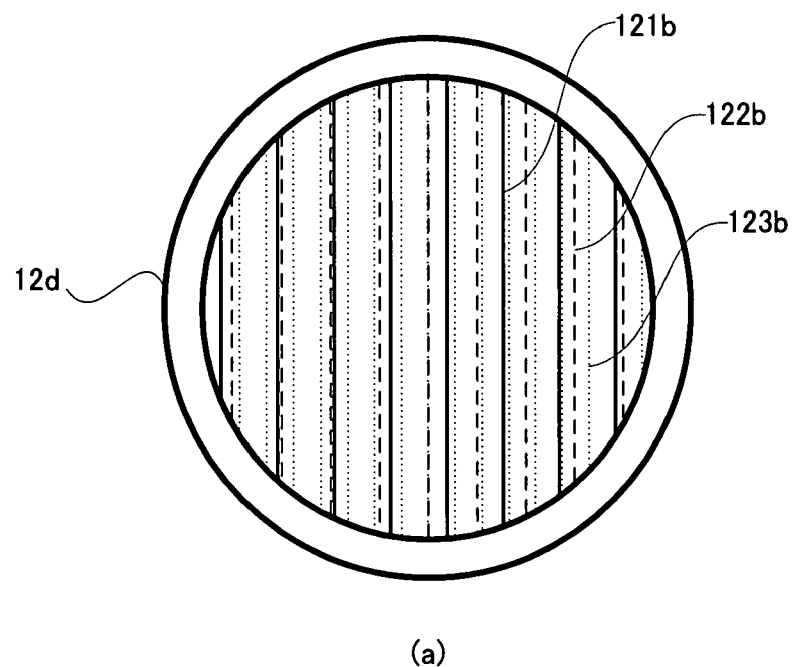
(a)
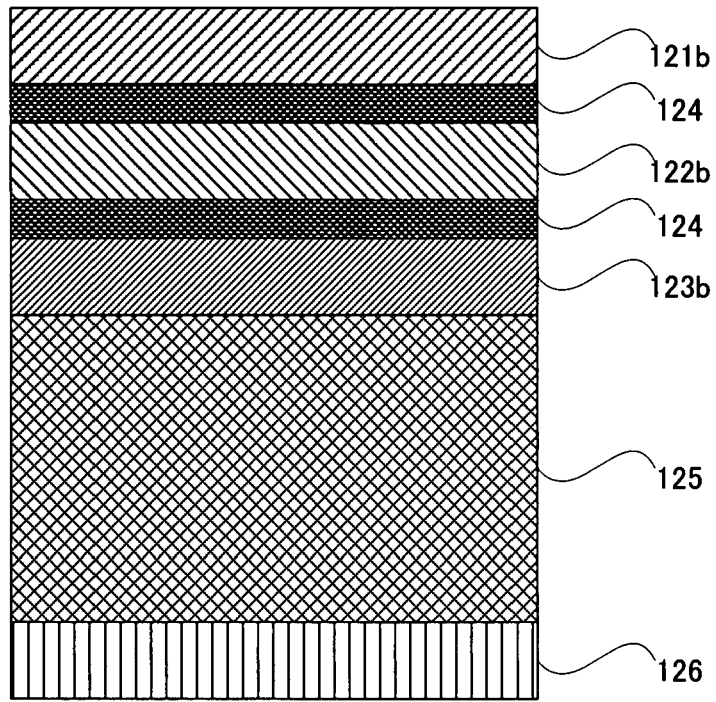
(b)

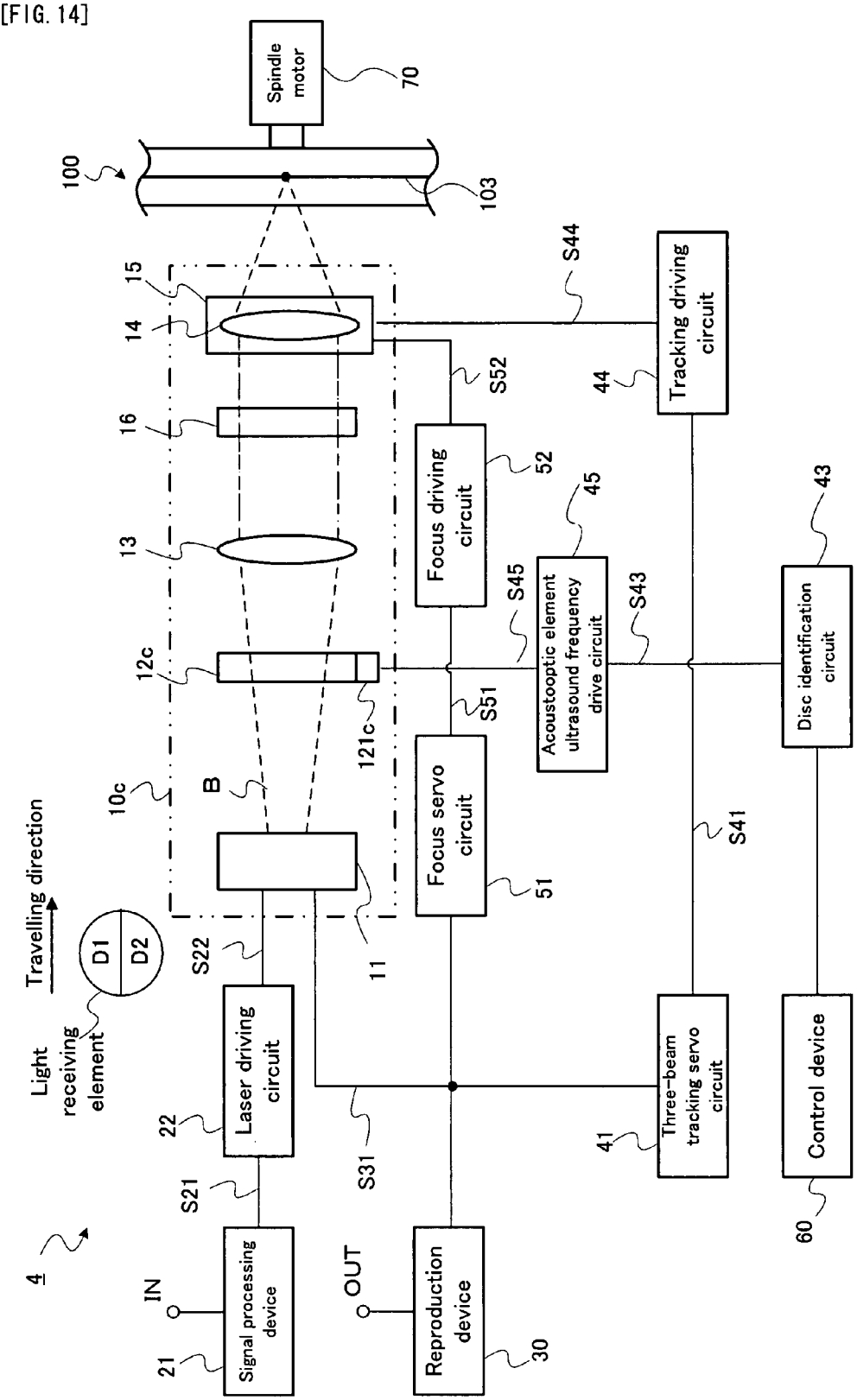
[FIG. 14]

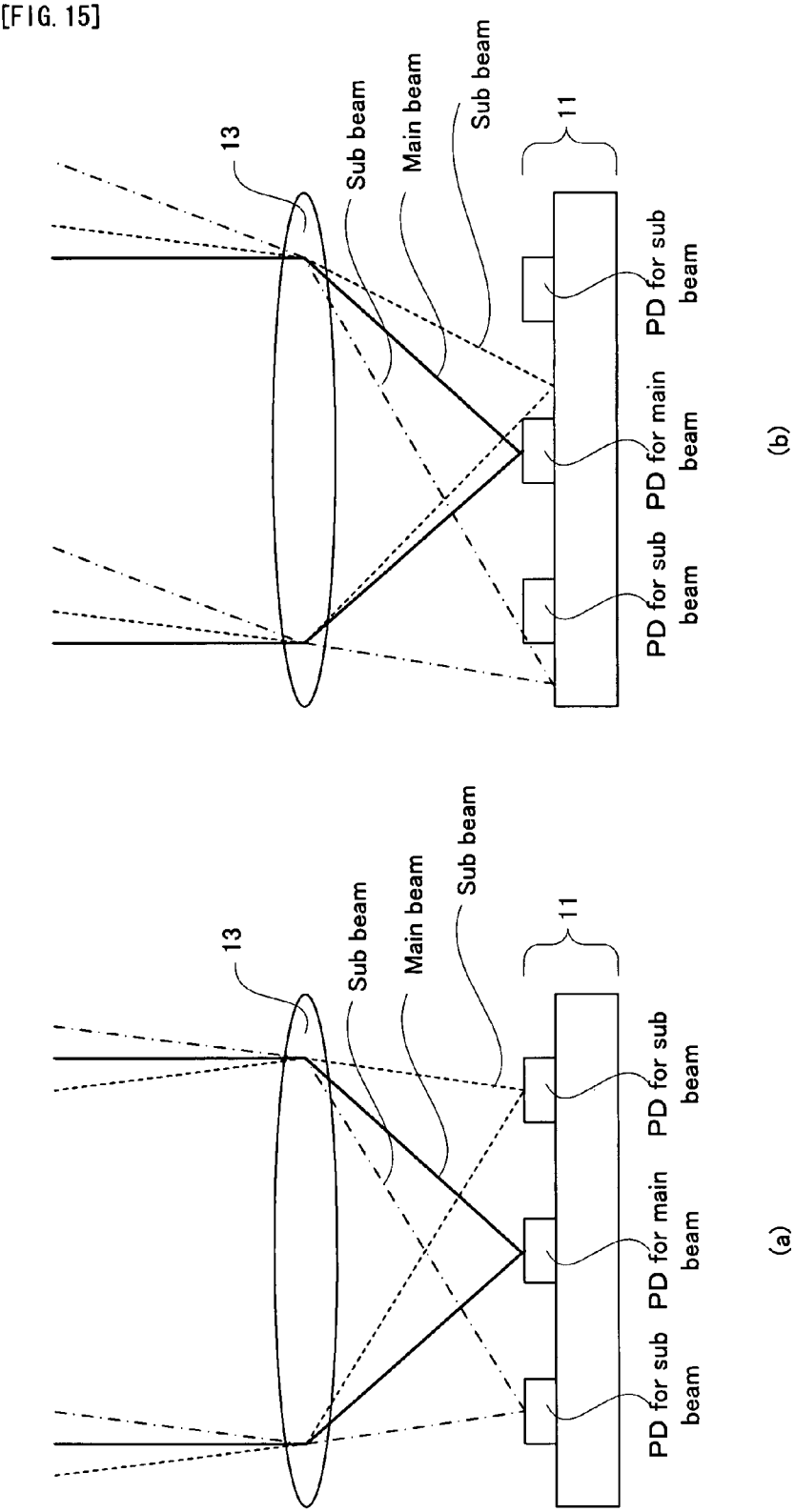
[FIG. 15]

[FIG. 16]
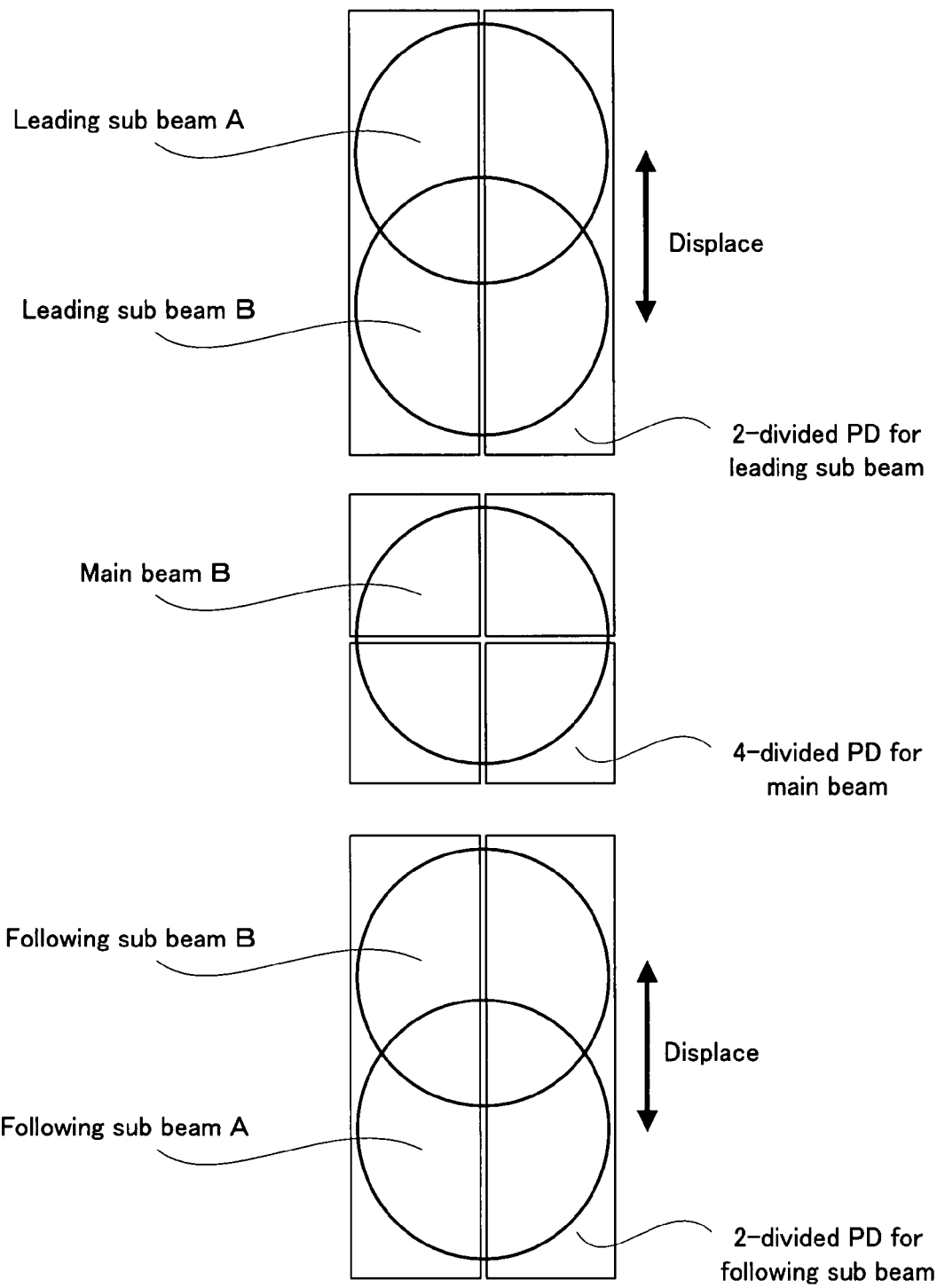

[FIG. 17]
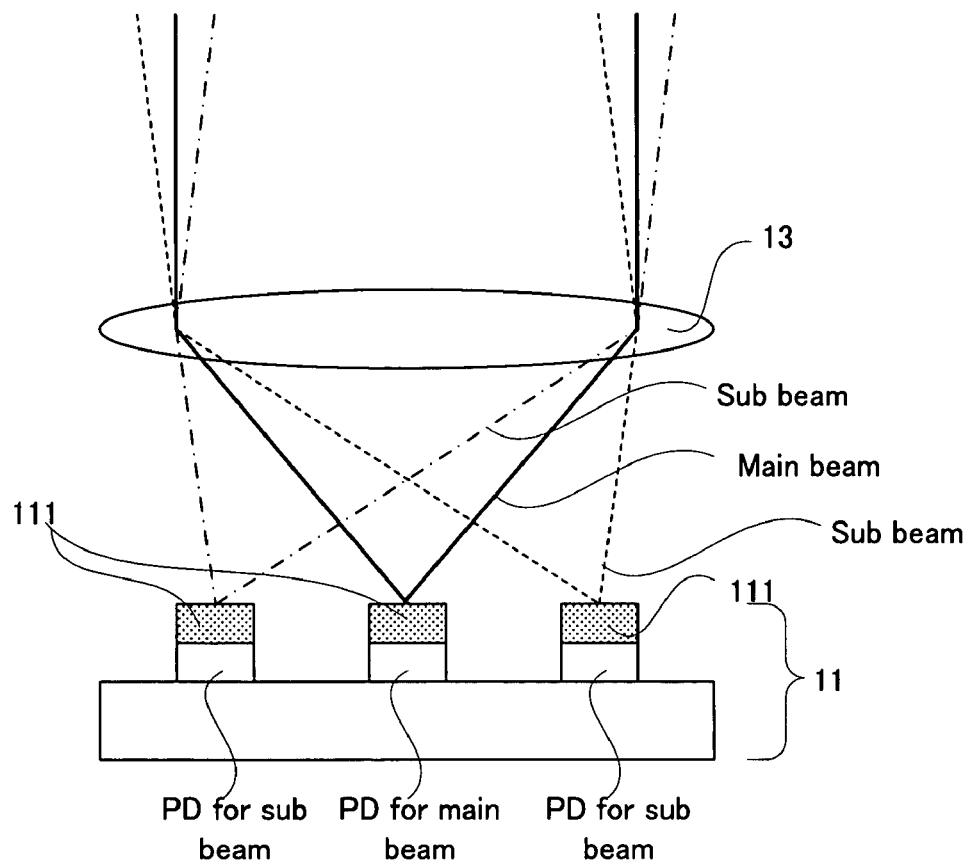

[FIG. 18]
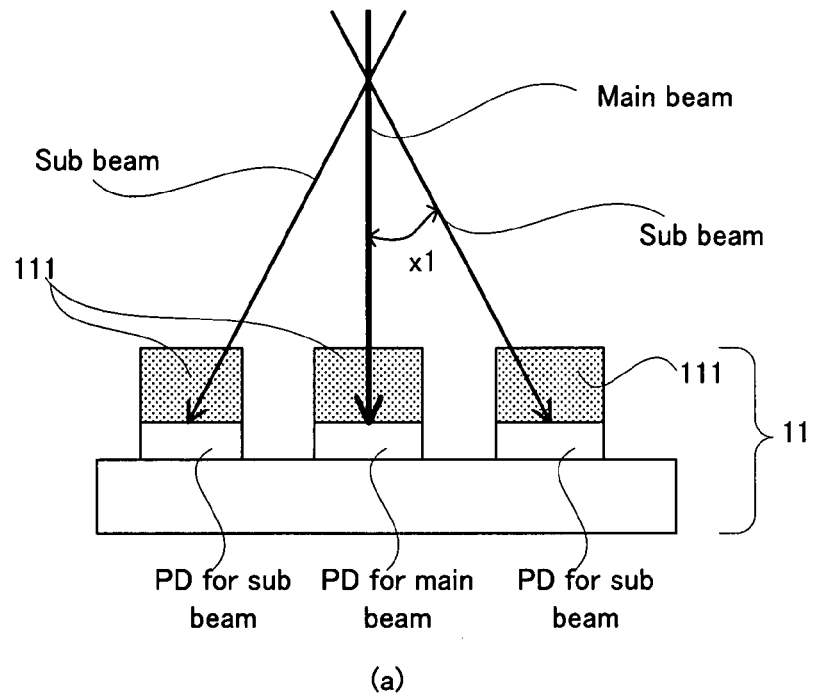
(a)
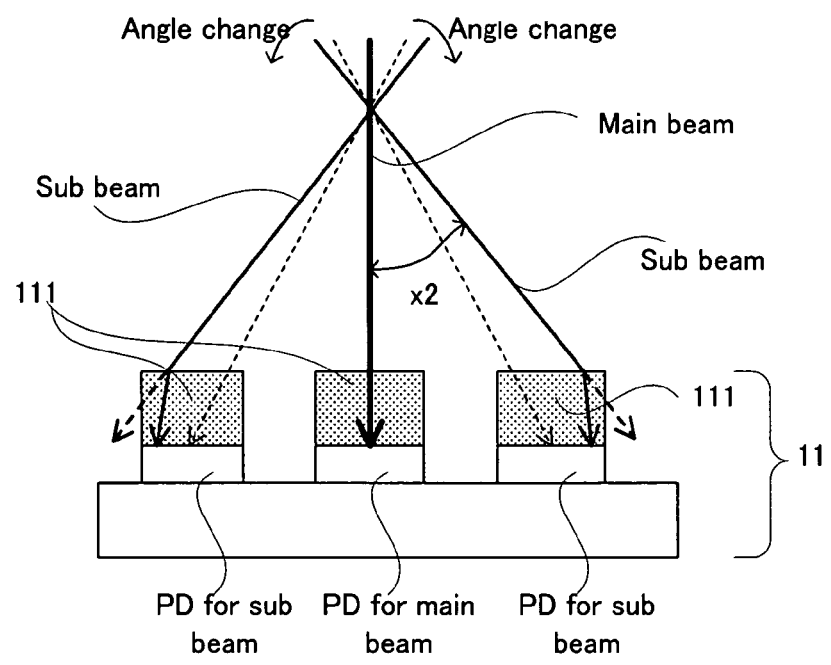
(b)

[FIG. 19]
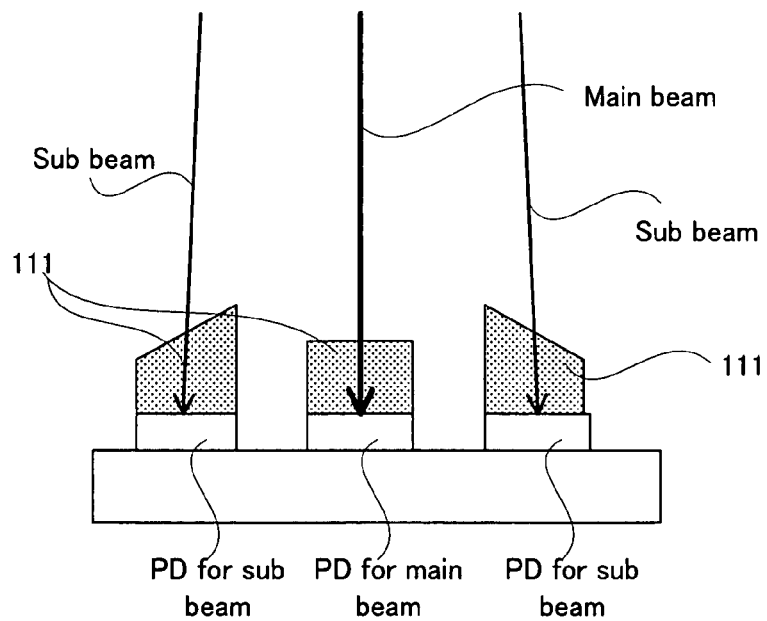
(a)
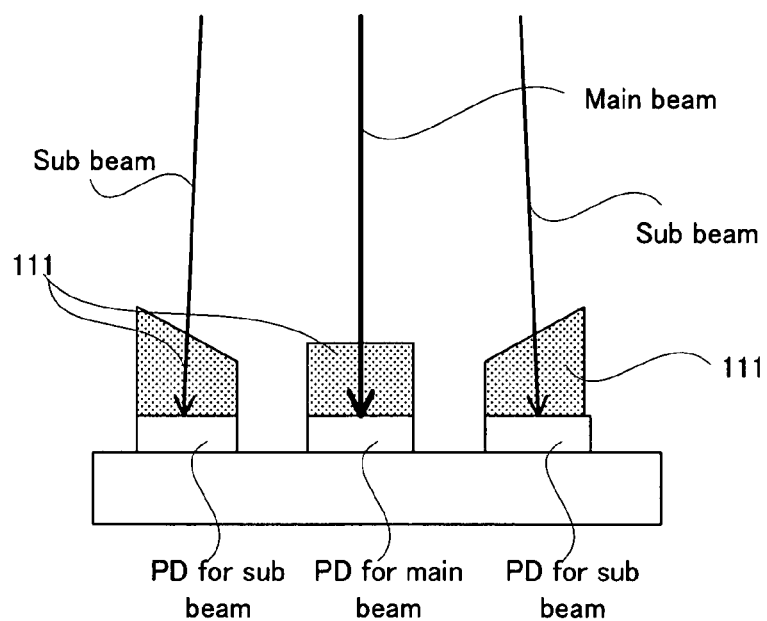
(b)

[FIG. 20]
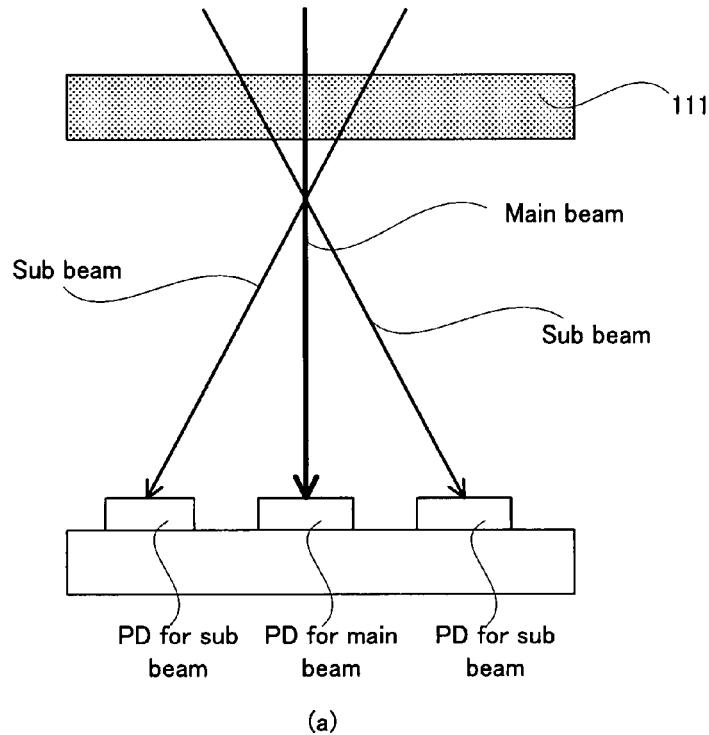
(a)
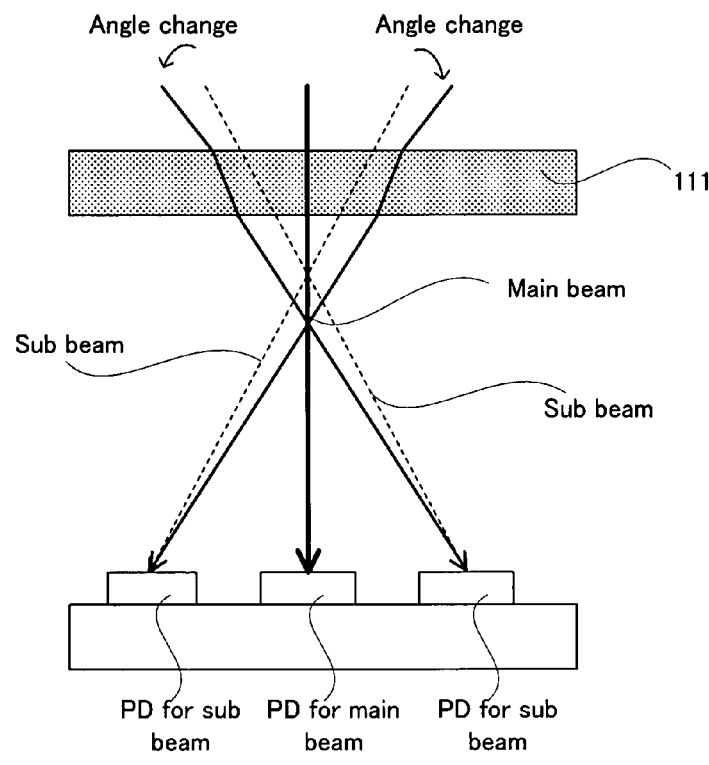
(b)

[FIG. 21]
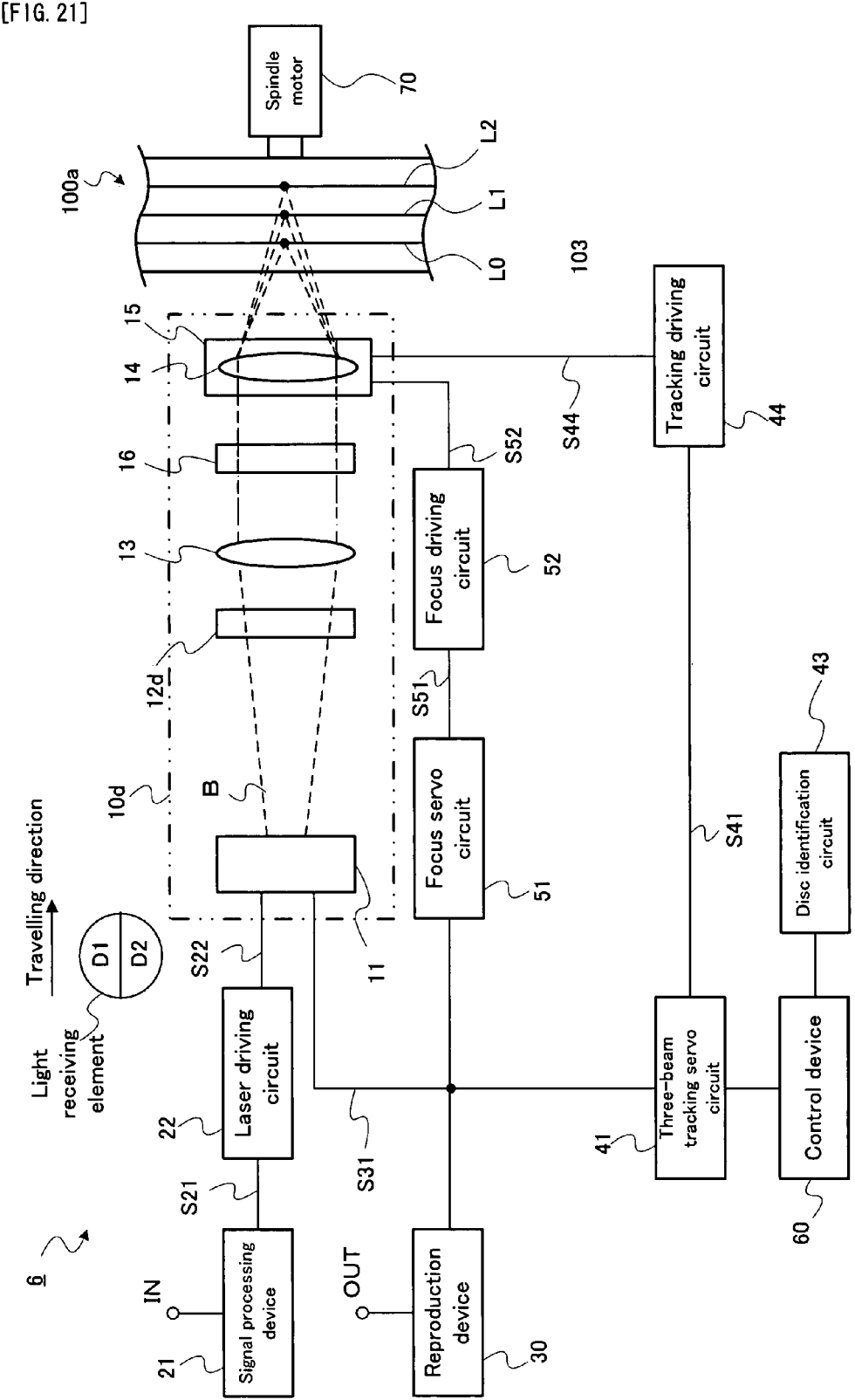

RECORDING APPARATUS AND RECORDING MEDIUM, AND COMPUTER PROGRAM

TECHNICAL FIELD

The present invention relates to a recording apparatus and method, such as a DVD recorder, and a computer program which makes a computer function as the recording apparatus.

BACKGROUND ART

For example, when data is recorded onto an optical disc, such as a CD, a DVD, ad a Blu-ray Disc, a tracking process (or tracking control) of a semiconductor laser is performed. As one specific example of the tracking process, a three-beam tracking method disclosed in a non-patent document 1 is listed. The three-beam tracking method is a technology explained as follows. Firstly, a light beam emitted from an optical pickup enters into a diffraction grating, thereby a main beam, which is mainly used for recording data, and two sub beams, which are mainly used for the tracking process, are generated. And then, the sub beams are used to perform the tracking process. The spots of each of the two sub beams are shifted by half of a track pitch, compared with the spot of the main beam, on the recording surface of a single layer type optical disc. The tracking process is performed by detecting a difference in the amount of light (or phase) which is obtained by receiving the reflected light of the two sub beams with a two-divided photo detector or the like.

Non-Patent document 1: "optical head for magneto-optical disk", Electronic Materials, Kogyo Chosakai Publishing, published on Jul. 1, 1988, vol. 27, no. 7, p 73-74

DISCLOSURE OF INVENTION

Subject to be Solved by the Invention

There is, however, such a technical problem that, even if the tracking process using the aforementioned three-beam tracking method can be preferably performed on a recording apparatus for recording the data only on any one of the different optical discs, such as a CD, a DVD, and a Blu-ray disc, the tracking process using the aforementioned three-beam tracking method cannot be preferably performed when the data is recorded onto each of the optical discs. In other words, there is such a technical problem that simply irradiating the optical disc with the main beam and the sub beams does not allow the preferable tracking process to be performed in association with each of the optical discs, because each optical disc has a different standard (e.g. a structure and size on a recording surface, a recording capacity, a recording aspect of recording the data, or the like). The same is true even if three or more sub beams are used.

The aforementioned problems are listed as the subject to be solved by the present invention. It is therefore an object of the present invention to provide a recording apparatus and method, and a computer program, which preferably allow the tracking process using a plurality of light beams to be performed on a plurality of types of recording media.

Means for Solving the Subject (Recording Apparatus)

The above object of the present invention can be achieved by a recording apparatus provided with: a recording device for recording data onto each of a plurality of types of recording media by irradiating a light beam corresponding to each of the types of recording media; a diffracting device, which is disposed on an optical path of the light beam from the recording device to the recording medium, for generating a main beam and a plurality of sub beams by making the optical beam diffract, the main beam being used to record the data and perform a tracking process, the sub beams being used to perform the tracking process, an amplitude of a tracking signal which is generated by each or one portion of the sub beams and by the main beam being maximum; a controlling device for controlling the diffracting device to adjust a position on which each of the plurality of sub beams is focused, in accordance with the type of the recording medium; and a tracking device for performing the tracking process by using the tracking signal.

According to the recording apparatus of the present invention, the recording medium, such as the optical disc, is irradiated with the light beam by the operation of the recording device. In particular, the recording apparatus in the present invention is adapted to record the data onto the plurality of types of recording media. In order to record the data onto the plurality of types of recording media, the light beam is irradiated in accordance with the type of the recording medium which is a data recording target. As a result, the data can be recorded onto each of the plurality of types of recording media.

In particular in the present invention, the diffracting device is disposed between the recording device and the recording medium. More specifically, the diffracting device is disposed in the optical path of the light beam which reaches from the recording device to the recording medium. The light beam irradiated from the recording device enters the diffracting device and is then focused on the recording medium (specifically, e.g. a desired recording layer for the data to be recorded). The diffracting device makes the light beam which is irradiated from the recording device diffract, to thereby generate the main beam, which is mainly used for the data recording and the tracking process in the recording operation, and the plurality of sub beams, which are used for the tracking process in the recording operation. As a result, the data is recorded by focusing the main beam on the recording medium. At this time, the light beam preferably diffracts in a preferable aspect, in accordance with the type of the recording medium, which is a data recording target.

At this time, the diffracting device generates the plurality of sub beams so as to maximize the amplitude of the tracking signal, which is generated from each or one portion of the plurality of sub beams and the main beam. In other words, the controlling device adjusts the position on which each of the sub beams is focused is adjusted in accordance with the type of the recording medium and thereby the diffracting device generates the plurality of sub beams so as to maximize the amplitude of the tracking signal, which is generated from each or one portion of the plurality of sub beams and the main beam. That is, the diffracting device generates one or a plurality of sub beams which maximize the amplitude of the tracking signal. Or the diffracting device generates the plurality of sub beams which include the one or the plurality of sub beams which maximize the amplitude of the tracking signal. Incidentally, the "tracking signal" herein broadly includes a signal obtained from the reflected light of each or at least one of the plurality of sub beams and the main beam, in order to perform the tracking process. Moreover, the tracking signal for controlling the tracking process is generated from the reflected light of each or at least one of the plurality of sub beams and the main beam. After that, by the operation of the tracking device, the tracking process is performed by using the tracking signal generated from the reflected light of each or at least one of the plurality of sub beams and the main beam.

In general, if the tracking process is performed by using the plurality of light beams on the plurality of types of recording media, an aspect or state of the recording area on which the sub beams are focused in the case where the data is recorded onto one recording medium may be different from an aspect or state of the recording area on which the sub beams are focused in the case where the data is recorded onto another recording medium. This will be explained in details in Embodiments described later by using drawings, but this is caused by the fact that each recording medium has a different track pitch of a recording track on which the data is recorded, or the like. At this time, in some cases, the tracking signals obtained on the respective recording media are different. Specifically, for example, even if the preferable tracking signal (e.g. the tracking signal which maximizes the amplitude) can be obtained on one recording medium, the preferable tracking signal cannot be obtained on another recording medium. In the present invention, however, the sub beams, which maximize the amplitude of the tracking signal, are irradiated onto the recording medium by the diffracting device. Then, since the tracking signal is generated by using the sub beams generated in this manner, the tracking process can be performed on the plurality of types of recording media without any special problem.

As a result, according to the recording apparatus of the present invention, it is possible to preferably perform the tracking process using the plurality of light beams, on the plurality of types of recording media.

In one aspect of the recording apparatus of the present invention, the controlling device controls the diffracting device to adjust the position on which each of the plurality of sub beams is focused by rotating the position on which each of the plurality of sub beams with a spot of the main beam (i.e. the spot formed by focusing the main beam thereon) being centered.

According to this aspect, it is possible to change the position on which each of the sub beams is focused. For example, it is possible to change an angle at which a line, which connects the positions on which the respective plurality of sub beams are focused, crosses a traveling direction of the main beam. By this, it is possible to change an interval, arrangement, or the like, as occasion demands, in which each of the plurality of sub beams is focused, for each recording medium on which the data is recorded. Therefore, it is possible to preferably perform the tracking process using the plurality of light beams, on the plurality of types of recording media.

In an aspect of the recording apparatus in which the position on which each of the plurality of sub beams is focused is rotated, as described above, the controlling device may control the diffracting device to rotate the position on which each of the plurality of sub beams is focused, in accordance with a track pitch of a concentric or spiral recording track, which is formed on the recording medium and which is used to record the data.

By virtue of such construction, it is possible to preferably perform the tracking process using the plurality of light beams, on the plurality of types of recording media whose track pitches are different from each other.

In an aspect of the recording apparatus in which the position on which each of the plurality of sub beams is focused is rotated, as described above, the controlling device may control the diffracting device to rotate said diffracting device by a predetermined angle, with an irradiation direction of the light beam being a rotational axis and with a position on which the main beam is focused being a center point.

By virtue of such construction, it is possible to rotate the position on which each of the plurality of sub beams is focused, relatively easily.

In an aspect of the recording medium in which the diffracting device is rotated by the predetermined angle, as described above, it may be further provided with: an elastic body; a magnetic device connected to each of the elastic body and the diffracting device; and an electromagnet for applying a magnetic field to the magnetic device, the controlling device rotating the diffracting device by the predetermined angle by applying or not applying an electric current to the electromagnet.

By virtue of such construction, it is possible to rotate the diffracting device, relatively easily. Of course, even except for this construction, the diffracting device may be rotated by using at least one of an electric action and a magnetic action, for example.

In an aspect of the recording apparatus in which the position on which each of the plurality of sub beams is focused is rotated, as described above, the diffracting device may include a liquid crystal element, and the controlling device controls a voltage application pattern to the liquid crystal element.

By virtue of such construction, it is possible to rotate the position on which each of the plurality of sub beams is focused, relatively easily.

In an aspect of the recording apparatus in which the position on which each of the plurality of sub beams is focused is rotated, as described above, a concentric or spiral recording track which is used to record the data may be formed on the recording medium, and the controlling device may control the diffracting device such that the recording track in which the data is already recorded is disposed in both edge portions of a spot on which one of the plurality of sub beams is focused (i.e. a spot formed by focusing one sub beam), and such that the recording track in which the data is unrecorded is disposed in both edge portions of a spot on which another one of the plurality of sub beams is focused (i.e. a spot formed by focusing another sub beam).

By virtue of such construction, recording aspects in the both edge portions of the spot formed by each of the one sub beam and the another sub beam (i.e. two of the plurality of sub beams) are substantially the same. Specifically, for example, regarding the one sub beam, the recording track in which the data is already recorded is located in each of one side and the other side, with the traveling direction of the main beam being centered. On the other hand, regarding the another sub beam, the recording track in which the data is unrecorded is located in each of one side and the other side, with the traveling direction of the main beam being centered. In other words, regarding each of the sub beams, the recording tracks which have different recording aspects are not disposed in the both edge portions. Thus, for example, if the reflected light of the sub beams is received by the light receiving element having the two light receiving portions divided in the traveling direction of the main beam, the amounts of the reflected light are substantially the same in the respective light receiving portions. Therefore, it is possible to preferably perform the tracking process using the plurality of light beams.

In another aspect of the recording apparatus of the present invention, the diffracting device is provided with diffraction grating, and the controlling device controls the diffracting device to change a grating interval of the diffraction grating.

According to this aspect, it is possible to change the position on which each of the plurality of sub beams is focused, which is generated by the diffracting device, relatively easily, by changing the grating interval of the diffracting device. Therefore, for example, it is possible to expand and narrow the interval between the main beam and the sub beams. Therefore, it is possible to change the interval, arrangement, or the like, as occasion demands, in which each of the plurality of sub beams is focused, for each recording medium on which the data is recorded. Therefore, it is possible to preferably perform the tracking process using the plurality of light beams, on the plurality of types of recording media.

In an aspect of the recording apparatus in which the grating interval of the diffraction grating is changed, as described above, the controlling device may control the diffracting device to change the grating interval in accordance with a track pitch of a concentric or spiral recording track, which is formed on the recording medium and which is used to record the data.

By virtue of such construction, it is possible to preferably perform the tracking process using the plurality of light beams, on the plurality of types of recording media whose track pitches are difference from each other.

In an aspect of the recording apparatus in which the grating interval of the diffraction grating is changed, as described above, a concentric or spiral recording track for recording the data may be formed on the recording medium, and the controlling device may control the diffracting device such that the recording track in which the data is already recorded is disposed in both edge portions of a spot on which one of the plurality of sub beams is focused, and such that the recording track in which the data is unrecorded is disposed in both edge portions of a spot on which another one of the plurality of sub beams is focused.

By virtue of such construction, as described above, regarding each of the sub beams, the recording tracks which have different recording aspects are not disposed in the both edge portions. Therefore, as described above, it is possible to preferably perform the tracking process using the plurality of light beams.

In an aspect of the recording apparatus in which the grating interval of the diffraction grating is changed, as described above, the diffracting device may include a liquid crystal element, and the controlling device may control a voltage application pattern to the liquid crystal element.

By virtue of such construction, it is possible to change the grating interval of the diffraction grating, relatively easily.

In another aspect of the recording apparatus of the present invention, the diffracting device includes an acoustooptic element which realizes an acoustooptic effect, and the controlling device is further provided with: a propagating device for propagating ultrasound with a predetermined frequency into the acoustooptic element; and a frequency changing device for changing the frequency of the ultrasound.

According to this aspect, propagating the ultrasound in the acoustooptic element allows the acoustooptic effect to appear in the acoustooptic element. As a result, the variation patterns of the refractive index occur in the acoustooptic element. At this time, the interval between the variation patterns of the refractive index is changed by changing the frequency of the propagated ultrasound. As a result, it is possible to change the position on which each of the plurality of sub beams is focused, relatively easily. This is practically equal to the situation that the grating interval of the diffracting device is changed, as described later. Therefore, it is possible to expand or narrow the interval between the main beam and the sub beams. Therefore, it is possible to it is possible to change the interval, arrangement, or the like, as occasion demands, in which each of the plurality of sub beams is focused, for each recording medium on which the data is recorded. Therefore, it is possible to preferably perform the tracking process using the plurality of light beams, on the plurality of types of recording media.

In an aspect of the recording apparatus provided with the diffracting device including the acoustooptic element, as described above, the frequency changing device may change the frequency in accordance with a track pitch of a concentric or spiral recording track, which is formed on the recording medium and which is used to record the data.

By virtue of such construction, it is possible to preferably perform the tracking process using the plurality of light beams, on the plurality of types of recording media whose different track pitches are different from each other.

In another aspect of the recording apparatus of the present invention, it is further provided with a light receiving device for receiving reflected light of at least one portion of the plurality of sub beams and the main beam, a light receiving surface, which receives the reflected light of at least one portion of the plurality of sub beams, of the light receiving device being divided in a direction toward which the position on which each of the plurality of sub beams is focused displaces.

According to this aspect, for example, the light receiving device receives the reflected light of the main beam and the sub beams, and thereby the tracking signal or the like is generated. At this time, even if the position on which each of the plurality of sub beams is focused is changed, it is possible to preferably receive the reflected light of each of the plurality of sub beams because the light receiving surface of the light receiving device is also divided as the position on which each of the plurality of sub beams is focused is changed. Therefore, even if the position on which each of the plurality of sub beams is focused is changed, the tracking signal can be preferably generated, and as a result, the preferable process can be performed.

In another aspect of the recording apparatus of the present invention, it is further provided with a light receiving device for receiving reflected light of at least one portion of the plurality of sub beams and the main beam, a light receiving surface, which receives the reflected light of at least one portion of the plurality of sub beams, of the light receiving device receiving the reflected light of at least one portion of the plurality of sub beams, through a member which changes a refractive index.

If the position on which each of the plurality of sub beams is focused is changed, the light receiving position (or light receiving surface) of the reflected light of the sub beam on the light receiving device is also changed. This may cause such a technical problem that the reflected light of the sub beam cannot be preferably received. According to this aspect, however, the reflected light of the sub beam is focused on the light receiving device through the member which changes the refractive index. Thus, the optical path of the reflected light of the sub beam is changed in the member which changes the refractive index. Therefore, if the refractive index is changed so as to focus the reflected light of the sub beam on the position at which the reflected light of the sub beam is to be focused on the light receiving device, even if the position on which each of the plurality of sub beams is focused is changed, the reflected light of each of the plurality of sub beams can be preferably received. Therefore, even if the position on which each of the plurality of sub beams is focused is changed, the tracking signal can be preferably generated, and as a result, the preferable process can be performed.

In another aspect of the recording apparatus of the present invention, the member which changes the refractive index has such a shape that an incident angle of the reflected light of at least one portion of the plurality of sub beams with respect to the member is greater than an incident angle of the reflected light of at least one portion of the plurality of sub beams with respect to the light receiving device.

According to this aspect, it is possible to relatively increase the incident angle of the reflected light of the sub beam with respect to the member which changes the refractive index. Therefore, it is possible to change the optical path of the reflected light of the sub beam, more preferably. As a result, even if the position on which each of the plurality of sub beams is focused is changed, it is possible to receive the reflected light of each of the plurality of sub beams, preferably.

In another aspect of the recording apparatus of the present invention, the recording medium is provided with a plurality of recording layers which respectively have different track pitches of concentric or spiral recording tracks which is used to record the data or which respectively have different recording capacities for the data.

According to this aspect, it is possible to preferably perform the tracking process using the plurality of light beams, even on the recording medium provided with the plurality of recording layers which have different track pitches (or recording capacities).

In another aspect of the recording apparatus of the present invention, the recording device irradiates the light beam with different wavelength, in accordance with a track pitch of a concentric or spiral recording track which is used to record the data or a recording capacity for the data of the recording medium.

According to this aspect, it is possible to preferably perform the tracking process using the plurality of light beams on the plurality of types of recording media, and it is also possible to preferably record the data onto the plurality of types of recording media.

(Recording Method)

The above object of the present invention can be also achieved by a recording method on a recording apparatus provided with: a recording device for recording data onto each of a plurality of types of recording media by irradiating a light beam corresponding to each of the types of recording media, the recording method provided with: a diffracting process of generating a main beam and a plurality of sub beams by making the optical beam diffract, the main beam being used to record the data and perform a tracking process, the sub beams being used to perform the tracking process, an amplitude of a tracking signal which is generated by each or one portion of the sub beams and by the main beam being; a controlling process of controlling the diffracting device to adjust a position on which each of the plurality of sub beams is focused, in accordance with the type of the recording medium; and a tracking process of performing the tracking process by using the tracking signal.

According to the recording method of the present invention, it is possible to receive the same various benefits as those of the recording apparatus of the present invention.

Incidentally, in response to the various aspects of the recording apparatus of the present invention described above, the recording method of the present invention can employ various aspects.

(Computer Program)

The above object of the present invention can be also achieved by computer program for recording control to control a computer provided in the aforementioned recording apparatus of the present invention (including its various aspects), the computer program making a computer function as at least one portion of the recording apparatus.

According to the computer program of the present invention, the recording apparatus of the present invention described above can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the recording apparatus of the present invention described above, the computer of the present invention can employ various aspects.

The above object of the present invention can be also achieved by a computer program product in a computer-readable medium for tangibly embodying a program of instructions executable by a computer provided in the aforementioned recording apparatus of the present invention (including its various aspects), the computer program product making the computer function as at least one portion of the recording apparatus.

According to each of the computer program product of the present invention, the recording apparatus of the present invention described above can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the recording apparatus of the present invention described above.

These effects and other advantages of the present invention will become more apparent from the following embodiments.

As explained above, the recording apparatus of the present invention is provided with the recording device, the diffracting device, the controlling device and the tracking device. The recording method of the present invention is provided with the diffracting process, the controlling process, and the tracking process. Therefore, it is possible to properly perform the tracking process using the three-beam tracking method of the like, on the plurality of types of recording media.

BRIEF DESCRIPTION OF DRAWINGS

FIG. 1 are a plan view and a cross sectional view showing the outline structure of an optical disc used in an embodiment.

FIG. 2 is a partially enlarged perspective view showing a recording surface of the optical disc used in the embodiment.

FIG. 3 is a block diagram conceptually showing the basic structure of a recording/reproducing apparatus in a first embodiment.

FIG. 4 is a block diagram conceptually showing the basic structure of a recording/reproducing apparatus in a modified example of the first embodiment.

FIG. 5 is a flowchart conceptually showing a flow of the recording operation of the recording/reproducing apparatus in the first embodiment.

FIG. 6 are plan views conceptually showing aspects of focusing a light beam.

FIG. 7 are plan views conceptually showing specific structures to rotate a grating element.

FIG. 8 are plan views conceptually showing the structure of the grating element including a liquid crystal element.

FIG. 9 is a block diagram conceptually showing the basic structure of a recording/reproducing apparatus in a second embodiment.

FIG. 10 are plan views conceptually showing the slits of the grating element.

FIG. 11 are plan views conceptually showing the aspect of focusing the light beam on the optical disc if the slit interval of the grating element is changed.

FIG. 12 is an outline view showing the emission of the light beam if the data is being recorded onto the optical disc, observed in a direction of crossing the travelling direction of the light beam.

FIG. 13 are plan views conceptually showing the structure of the grating element including a liquid crystal.

FIG. 14 is a block diagram conceptually showing the basic structure of a recording/reproducing apparatus in a third embodiment.

FIG. 15 are cross sectional views conceptually showing an aspect in which a light receiving element on a hologram laser receives reflected light of the light beam.

FIG. 16 is a plan view conceptually showing a first aspect of a light receiving surface of a PD.

FIG. 17 is a plan view conceptually showing a second aspect of the light receiving surface of the PD.

FIG. 18 are cross sectional views conceptually showing that the reflected light is focused on the PD shown in FIG. 17.

FIG. 19 are cross sectional views conceptually showing a third aspect of the light receiving surface of the PD.

FIG. 20 are cross sectional views conceptually showing a fourth aspect of the light receiving surface of the PD.

FIG. 21 is a schematic diagram conceptually showing that the light beam is emitted to a multilayer type disc.

DESCRIPTION OF REFERENCE CODES 1, 2, 3, 4, 6 recording/reproducing apparatus
11 hologram laser
12 grating element
41 three-beam tracking servo circuit
42 grating driving element
43 disc identification circuit
44 tracking driving circuit
45 acoustooptic element ultrasound frequency drive circuit
60 control device
100 optical disc
111 refractive index changing element

BEST MODE FOR CARRYING OUT THE INVENTION

Hereinafter, the best mode for carrying out the present invention will be discussed in order for each embodiment, with reference to the drawings.

(Structure of Optical Disc)

Firstly, the structure of an optical disc 100 on which data is recorded and the recorded data is reproduced by a recording/reproducing apparatus in an embodiment will be explained by using FIG. 1 and FIG. 2. FIG. 1 are a plan view and a cross sectional view showing the outline structure of the optical disc 100. FIG. 2 is a partially enlarged perspective view showing a recording surface of the optical disc 100.

As shown in FIG. 1(a), the optical disc 100 is a circular disk shape with a diameter of about 12 cm, and it is provided with a center hole 102 in the center. As examples of the optical disc 100, there are listed a DVD±R, a DVD±RW, a DVD-RAM, a BD (Blu-ray Disc), a HD DVD (High Definition DVD) and the like. As shown in FIG. 1(b), the optical disc 100 has such a structure that a recording layer 103 is disposed between transparent substrates 101a and 101b. Moreover, in each recording area in the recording layer 103, not-illustrated tracks, such as a groove track and a land track, are alternately displaced, spirally or concentrically, centered on the center hole 102. The data is divided and recorded by a unit of ECC block, on each or either one of the groove track and the land track.

The structure of the optical disc 100 will be more specifically explained. As shown in FIG. 2, on the optical disc 100, a recording film 113 of a phase change recording type or an irreversible change recording type by heat or the like, which constitutes the recording surface for the data, is laminated on (or on the lower side in FIG. 2) the disc-shaped transparent substrate 101a, and a reflective film 118 is laminated on (or on the lower side in FIG. 2) the recording film 113. Lastly, the transparent substrate 101b is laminated on the reflective film 118. On the recording surface which is the surface of the recording film 113, a groove track GT and a land track LT, which constitute one specific example of the "recording track", are alternately formed. Incidentally, upon the recording and the reproduction of the optical disc 100, as shown in FIG. 2, for example, the groove track GT is irradiated with a light beam B through the transparent substrate 101a. For example, upon the recording, by irradiating the light beam B with a recording laser power, the phase change recording or the irreversible change recording by heat or the like is performed on the recording film 113, in accordance with the data to be recorded. On the other hand, upon the reproduction, by irradiating the light beam B with a reproduction laser power, which is weaker than the recording laser power, the data recorded in the recording film 113 is read.

The groove track GT is wobbled with a certain amplitude and at a certain spatial frequency. The cycle of the wobble 119 is set to a predetermined value. On the land track LT, there is formed an address pit which is referred to as a land pre-pit LPP and which indicates a pre-format address. By virtue of the two addressing (i.e. the wobble 119 and the land pre-pit LPP), it is possible to obtain information necessary for disc rotation control during the recording, generation of a recording clock, or data recording, such as a recording address. Incidentally, it is also possible to record the information that is necessary for the data recording, such as the pre-format address, by modulating the wobble 119 of the groove track GT in a predetermined modulation method in advance, such as frequency modulation and phase modulation.

FIRST EMBODIMENT OF RECORDING/REPRODUCING APPARATUS

Next, with reference to FIG. 3 to FIG. 9, an explanation will be given on a recording/reproducing apparatus as a first embodiment of the recording apparatus of the present invention.

(1) Structure

Next, with reference to FIG. 3, the structure of a recording/reproducing apparatus 1 as the first embodiment of the recording apparatus of the present invention will be discussed. FIG. 3 is a block diagram conceptually showing the basic structure of the recording/reproducing apparatus 1 in the first embodiment.

As shown in FIG. 3, the recording/reproducing apparatus 1 is provided with: an optical pickup 10; a signal processing device 21; a laser driving circuit 22; a reproduction device 30; a three-beam tracking servo circuit 41; a grating driving circuit 42; a disc identification circuit 43; a tracking driving circuit 44; a focus servo circuit 51; a focus driving circuit 52; a control device 60; and a spindle motor 70. The recording/reproducing apparatus 1 is an apparatus for recording data on the optical disc 100 and for reproducing the data recorded on the optical disc 100 by irradiating the light beam B to the optical disc 100.

The optical pickup 10 is provided with: a hologram laser 11; a grating element 12; a collecting lens 13; an objective lens 14; an actuator device 15 for holding the objective lens 14; and three-wavelengths compatible element 16.

The hologram laser 11 constitutes one specific example of the "recording device" of the present invention, and the hologram laser 11 has a laser tip, a substrate, a light receiving element, a hologram element, and the like, which are not illustrated. The laser tip and the light-receiving element are disposed on the same substrate, and the hologram element is disposed facing the light beam B output side of the substrate. The laser tip emits the light beam B, and the light-receiving element receives the inputted light beam B. The hologram element lets the light beam B, which is outputted from the laser tip, be transmitted therethrough as it is. And the hologram element deflects a light beam which enters from a surface opposite to the incident surface of the light beam B, to thereby focus the light beam on the light-receiving element on the substrate. As described above, the hologram laser 11 has functions as a light source and a detector.

Moreover, in the first embodiment, a three-beam tracking method is used to perform the tracking process (or tracking control). Therefore, the light-receiving element which receives the reflected light of the light beam B (more specifically, each of a plurality of light-receiving elements corresponding to respective one of a main beam and sub beams, described later) has a light-receiving portion which is divided into two (or four). For example, the light receiving element has a light-receiving device D1, which receives the reflected light on the left half of the light beam B, and a light-receiving device D2, which receives the reflected light on the right half, on the basis of a travelling direction of the light beam B on the optical disc 100. From the light-receiving element having the light-receiving devices D1 and D2 divided as described above, a sum signal, which is a sum of signals obtained on the respective light-receiving portions, a difference signal, which is a difference in the signals, or a push-pull signal is outputted as a light-receiving signal S31.

Moreover, the hologram laser 11 in the first embodiment is adapted to emit the light beam B corresponding to at least three wavelengths. For example, when the data is recorded or reproduced with respect to a CD, which constitutes one specific example of the optical disc 100, the hologram laser 11 emits the light beam B with a wavelength of about 780 nm. For example, when the data is recorded or reproduced with respect to a DVD, which constitutes one specific example of the optical disc 100, the hologram laser 11 emits the light beam B with a wavelength of about 650 nm. For example, when the data is recorded or reproduced with respect to a Blu-ray Disc or a HD DVD, which constitutes one specific example of the optical disc 100, the hologram laser 11 emits the light beam B with a wavelength of about 405 nm. Of course, the hologram laser 11 may emit the light beam B with other wavelengths. Moreover, the hologram laser 11 may emit the light beam B corresponding to a plurality of wavelengths by using a single laser tip, or by using a plurality of laser tips. Moreover, the hologram laser 11 may emit the light beam B corresponding to the plurality of wavelengths by using a dichroic mirror. Moreover, the hologram laser 11 in the first embodiment is constructed to emit the light beam B corresponding to at least three wavelengths; however, this is merely one example, and the hologram laser 11 may emit the light beam B corresponding to two wavelengths. Moreover, the hologram laser 11 may emit the light beam B corresponding to a disc which has different track pitches, by using one wavelength.

The grating element 12 constitutes one specific example of the "diffracting device" of the present invention, and the grating element 12 makes the light beam B which is emitted from the hologram laser 11 diffract and generates a main beam, which is mainly used to record the data and to performing the tracking process, and two sub beams, which is mainly used to perform the tracking process. The grating element 12 may include a transparent substrate having many slits (or grooves), or may include a liquid crystal slit including a liquid crystal element.

Incidentally, notice that, in the explanation below, if the word of the light beam B is used without special noting, "the light beam B" indicates not only the light beam B itself which is emitted from the hologram laser 11 but also all of the main beam and the two sub beams which are generated on the grating element 12 in some cases.

The collecting lens 13 makes the incident light beam B substantially parallel and makes it enter the objective lens 14. More specifically, the collecting lens 13 makes each of the main beam and the two sub beams, which are generated on the grating element 12, substantially parallel, and the collecting lens 13 makes them enter the objective lens 14.

The objective lens 14 is provided for the actuator device 15. The actuator device 15 has a driving mechanism for changing the disposed position of the objective lens 14. The actuator device 15 displaces the position of the objective lens 14 in a tracking direction, in accordance with an actuator driving signal S44, which is supplied from the tracking driving circuit 44. In this manner, a tracking process (or tracking control) is performed.

Moreover, the actuator device 15 displaces the position of the objective lens 14 in a focus direction, in accordance with an actuator driving signal S52, which is supplied from the focus driving circuit 52. In this manner, a focus process (or focus control) is performed.

The light beam B, which is made to be substantially parallel light by the collecting lens 13, enters the objective lens 14. The objective lens 14 focuses the light beam B and irradiates the light beam B on the optical disc 100.

The three-wavelengths compatible element 16 includes an aperture control element which has wavelength selectivity or an aberration correction element. The three-wavelengths compatible element 16 performs aberration correction or adjusts a numerical aperture (NA), in accordance with the wavelength of the light beam B emitted from the hologram laser 11. Moreover, the three-wavelengths compatible element 16 may be correct spherical aberration in association with the thickness of a disc substrate.

The signal processing device 21 has an input terminal IN. The signal processing device 21 performs signal processing on the data, which is inputted from the exterior through the input terminal IN, on the basis of a control signal which is supplied from the control device 60 through a not-illustrated control line. The signal processing device 21 outputs the data to the laser driving circuit 22 as a record signal S21. More specifically, the signal processing device 21 generates the record signal S21 by appending an address, parity, error correction code (ECC), and a sync frame (or synchronization frame), by performing a scramble process, or by performing various modulation such as 8/16 modulation, with respect to the data inputted from the exterior.

The laser driving circuit 22 is mainly provided with an amplification circuit. The laser driving circuit 22 generates a laser driving signal S22 by amplifying or the like the record signal S21, which is inputted from the signal processing device 21, and supplies the laser driving signal S22 to the hologram laser 11 of the optical pickup 10. A gain of the laser driving circuit 22 is controlled by the signal processing device 21. If data is recorded onto the optical disc 100, the gain is controlled such that the light beam B with an energy amount (hereinafter referred to a "recording power") which allows a phase change or a heat change on the optical disc 100 is outputted from the hologram laser 11. On the other hand, if the data recorded on the optical disc 100 is reproduced, the gain is controlled such that the light beam B with an energy amount (hereinafter referred to a "reproduction power") which does not allow a phase change or a heat change on the optical disc 100 is outputted from the hologram laser 11.

The reproduction device 30 has an output terminal OUT. The reproduction device 30 outputs reproduction data corresponding to a light-receiving signal S31, which is supplied from the hologram laser 11, to the output terminal OUT, on the basis of the control signal which is supplied from the control device 60 through the not-illustrated control line. The light-receiving signal S31 is a signal which indicates the amount of light received on each light-receiving element, or the like. The reflected light of the light beam B, received by the hologram laser 11, is received by the plurality of light-receiving elements or the like, and thereby the amount of the light is obtained. In particular, in the embodiment, the reflected light of the light beam B is received by the light-receiving elements or the like corresponding to the main beam and the two sub beams, respectively, and thereby the light-receiving signal S31 corresponding to each of the main beam and the two sub beams is obtained.

The three-beam tracking servo circuit 41 generates a tracking servo control signal (or tracking error signal) S41 on the basis of the light-receiving signal S31, which is outputted from the hologram laser 11. More specifically, the tracking servo control signal S41 is generated by subtracting the push-pull signals of the two sub beams from the push-pull signal of the main beam. After that, the three-beam tracking servo circuit 41 supplies the tracking servo control signal S41 to the tracking driving circuit 44. Incidentally, the three-beam tracking method is the same as that in the aforementioned prior art or other conventional technologies, except for the characteristic portions of the present invention, so the basic explanation thereon will be omitted.

The grating driving circuit 42 constitutes one specific example of the "controlling device" of the present invention with the control device 60. The grating driving circuit 42 rotates the grating element 12 by a predetermined angle, under the control of the control device 60, on the basis of an identification signal S43 supplied from the disc identification circuit 43. The rotation process of the grating element 12 will be detailed later (refer to FIG. 7 or the like).

The disc identification circuit 43 supplies the identification signal S43 for identifying the type of the optical disc 100, on which the light beam B is currently focused, to the grating driving circuit 42. That is, the disc identification circuit 43 supplies the identification signal S43, which indicates whether the optical disc 100 on which the light beam B is currently focused is a CD, a DVD, a Blu-ray Disc, or the like, to the grating driving circuit 42. The disc identification circuit 43 may be adapted to generate the identification signal S43, on the basis of the light receiving signal S31 outputted from the hologram laser 11, under the control of the control device 60. Alternatively, it may be adapted to generate the identification signal S43, on the basis of the light receiving signal S31 obtained by reproducing a disc type flag, which is recorded on the optical disc 100. Alternatively, it may be adapted to generate the identification signal S43, on the basis of the thickness of the disc substrate obtained by measuring a focus S-shaped signal, which is detected in focus search. Specifically, the type of the optical disc is identified by detecting an interval between the focus S-shaped signals, which are outputted both when the focal position of the objective lens matches the disc surface and when the focal position matches a recording reflecting layer. For example, if the detected thickness of the substrate of the optical disc is 1.2 [mm], the optical disc can be judged to be a CD. If the detected thickness of the substrate of the optical disc is 0.6 [mm], the optical disc can be judged to be a DVD. If the detected thickness of the substrate of the optical disc is 0.1 [mm], the optical disc can be judged to be a Blu-ray Disc.

The tracking driving circuit 44 constitutes one specific example of the "tracking device" of the present invention. The tracking driving circuit 44 generates an actuator driving signal S44 on the basis of the tracking servo control signal S41, supplied from the three-beam tracking servo circuit 41, and drives the actuator device 15. That is, the tracking driving circuit 44 controls the actuator device 15 by supplying the actuator driving signal S44, and adjusts the position of the objective lens 14 in the radial direction (i.e. tracking direction) of the optical disc 100.

The focus servo circuit 51 generates a focus servo control signal (or focus error signal) S51 on the basis of the light receiving signal S31, outputted from the hologram laser 11. After that, the focus servo circuit 51 supplies the generated focus servo control signal S51 to the focus driving circuit 52.

The focus driving circuit 52 generates an actuator driving signal S52 on the basis of the focus servo control signal S51, supplied from the focus servo circuit 51, and drives the actuator device 15. That is, the focus driving circuit 52 controls the actuator device 15 by supplying the actuator driving signal S52, and adjusts a distance of the objective lens 14 from the optical disc 100 (i.e. a position in the focus direction).

The control device 60 is mainly provided with a CPU (Central Processing Unit), and outputs the control signals to the aforementioned various constituent elements through not-illustrated control lines, to thereby control the entire recording/reproducing apparatus 1.

The spindle motor 70 is adapted to rotate the optical disc 100 at a predetermined speed, on the basis of a spindle servo control signal which is generated by the light-receiving signal S31, outputted from the hologram laser 11.

Incidentally, the recording/reproducing apparatus 1 uses the hologram laser which has the functions as both the light source and the detector; however, the light source and the detector may be separately constructed as different elements. This structure will be explained with reference to FIG. 4. FIG. 4 is a block diagram conceptually showing the basic structure of a recording/reproducing apparatus 2 in a modified example of the first embodiment. Incidentally, the same constituent elements as those in the recording/reproducing apparatus 1 in FIG. 3 carry the same numerical references, and the detailed explanation thereof will be omitted.

As shown in FIG. 4, an optical pickup 10a in the recording/reproducing apparatus 2 in the modified example is provided with: a laser tip 17; a light receiving element 18; and a beam splitter 19, instead of the hologram laser 11.

The laser tip 17 has the function as the light source, from among the functions of the aforementioned hologram laser 11. On the other hand, the light receiving element 18 has the function as the detector, from among the functions of the aforementioned hologram laser 11. The beam splitter 19 makes the light beam B, which is outputted from the laser tip 17, be transmitted therethrough as it is, and deflects a light beam which enters from a surface opposite to the incident surface of the light beam B, to thereby focus the light beam on the light-receiving element 18.

Even by using the optical pickup 10a having such a structure, it is possible to perform the same operation as that of the recording/reproducing apparatus 1 in the first embodiment. Of course, even in a second embodiment to a fifth embodiment, which will be explained below, the same structure may be employed. Incidentally, in the explanation about an operation principle below, the recording/reproducing apparatus 1 in the first embodiment is used, for simplification of explanation.

(2) Operation Principle

Next, with reference to FIG. 5, an explanation will be given on the operation principle of the recording/reproducing apparatus 1 in the first embodiment (in particular, the recording operation). FIG. 5 is a flowchart conceptually showing a flow of the recording operation of the recording/reproducing apparatus 1 in the first embodiment.

As shown in FIG. 5, firstly, the type of the optical disc 100 on which the data is currently being recorded is identified (step S111). This identification is performed by the operation of the disc identification circuit 43, under the control of the control device 60. After that, the identification signal S43, which is the identification result, is outputted to the grating driving circuit 42.

Then, by the operation of the grating driving circuit 42, it is judged whether or not the grating element 12 is driven (i.e. is rotated by a predetermined angle) (step S112). For example, if the optical disc 100 on which the data is currently being recorded is a Blu-ray Disc, it may be judged that the grating element 12 is not driven. On the other hand, if the optical disc 100 on which the data is currently being recorded is a CD or a DVD, it may be judged that the grating element 12 is rotated by a predetermined angle.

As a result of the judgment, if it is judged that the grating element 12 is rotated (the step S112: Yes), the grating driving circuit 42 rotates the grating element 12 by the predetermined angle (step S113). Specifically, the grating driving circuit 42 rotates the grating element 12 by the predetermined angle in a predetermined direction, on the basis of the identification signal S42.

On the other hand, if it is judged that the grating element 12 is not rotated (the step S112: No), the grating driving circuit 42 does not rotate the grating element 12.

Then, the tracking servo control signal S41 is generated by the operation of the three-beam tracking servo circuit 41, on the basis of the light receiving signal S31, generated by receiving the reflected light of the light beam B on the light receiving element of the hologram laser 11 (step S114). After that, the tracking process is performed on the basis of the generated tracking servo control signal S41 (step S115). After the tracking process is performed, the data recording is started (step S101).

After that, it is judged whether or not the recording operation is to be ended, under the control of the control device 60 (step S121). As a result of the judgment, if it is judged that the recording operation is to be ended (the step S121: Yes), the recording operation is ended, and as occasion demands, a finalize process may be performed on the optical disc 100, or the optical disc 100 may be ejected from the recording/reproducing apparatus 1. Moreover, if the rotation of the grating element 12 can be fine-adjusted, the rotation-adjustment may be performed, as occasion demands, before or in the middle of the data recording so as to maximize the amplitude of the tracking error signal.

As described above, in the embodiment, the grating element 12 is selectively rotated by the predetermined angle, depending on the type of the optical disc 100 on which the data is recorded. The reason will be explained with reference to FIG. 6. FIG. 6 are plan views conceptually showing aspects of focusing the light beam B. Incidentally, FIG. 6 show the spots formed by the light beam B (i.e. the main beam and the sub beams) on the recording layer; however, the radius or the like of the spot in FIG. 6 is merely illustration, and it does not truly depict the size, such as a diameter, of the actual spot.

As shown in FIG. 6(a) to FIG. 6(c), the main beam forms the spot on the groove track on which the data is currently being recorded. Moreover, the two sub beams form the spots in positions, each of which is shifted by a half distance of a track pitch Tp from the spot formed by the main beam (specifically, on two land tracks LT adjacent to the groove track GT in which the data is currently being recorded). Since the data is recorded from the inner circumferential side to the outer circumferential side of the recording layer, here, the sub beam which forms the spot on the upper right (i.e. on the outer circumferential side) of the spot formed by the main beam in FIG. 6(a) to FIG. 6(c) is referred to as the leading beam, and the sub beam which forms the spot on the lower left (i.e. on the inner circumferential side) of the spot formed by the main beam in FIG. 6(a) to FIG. 6(c) is referred to as the following beam. Moreover, in FIG. 6(a) to FIG. 6(c), a recorded portion in which the data is already recorded is shown in a hatching pattern. That is, the data is not recorded in the groove tracks GT located on the both sides of the spot formed by the leading beam. On the other hand, the data is already recorded in the groove tracks GT located on the both sides of the spot formed by the following beam.

At this time, if the center of the spot formed by the main beam is not shifted from substantially the center of the groove track GT, the center of the spot of each of the leading beam and the following beam is formed at substantially the center of the land track LT. Thus, the amounts of reflected light or the like of the leading beam, which are received on the two-divided light receiving devices D1 and D2, are substantially equal. And the amounts of reflected light or the like of the following beam, which are received on the two-divided light receiving devices D1 and D2, are substantially equal. That is, the amounts of reflected light or the like in the right portion and the left portion of the spot formed by the leading beam are equal to each other, and the amounts of reflected light or the like in the right portion and the left portion of the spot formed by the following beam are equal to each other.

On the other hand, if the center of the spot formed by the main beam is shifted, for example, to the right from substantially the center of the groove track GT, the center of the spot of each of the leading beam and the following beam is formed at a position which is shifted to the right from substantially the center of the land track LT. Thus, the amounts of reflected light of the leading beam, which are received on the two-divided light receiving devices D1 and D2, are different from each other. And the amounts of reflected light or the like of the following beam, which are received on the two-divided light receiving devices D1 and D2, are different from each other. That is, the amounts of reflected light or the like in the right portion and the left portion of the spot formed by the leading beam are different from each other, and the amounts of reflected light or the like in the right portion and the left portion of the spot formed by the following beam are different from each other. The tracking process is performed such that the amounts of the light become equal, on the basis of the tracking servo control signal S41 generated by reflecting the difference in the amounts of the light or the like.

FIG. 6(a) shows an aspect in which the data is recorded on the optical disc 100 with a track pitch Tp of about 0.32 μm to 0.35 μm (specifically, e.g. a Blu-ray Disc or the like). In this case, an angle at which the line that connects the two sub beams crosses the travelling direction of the main beam is θ1.

On the other hand, FIG. 6(b) shows an aspect in which the data is recorded on the optical disc 100 with a track pitch Tp of about 0.74 μm (specifically, e.g. a DVD or the like). In this case, since the grating element 12 is rotated by the predetermined angle, an angle at which the line that connects the two sub beams crosses the travelling direction of the main beam is θ2 (θ2>θ1). Therefore, if the center of the spot formed by the main beam is not shifted from substantially the center of the groove track GT, the center of the spot formed by each of the leading beam and the following beam is formed in substantially the center of the land track LT. Moreover, the situation is maintained that the data is not recorded in the groove tracks GT which are located on the both edge sides of the spot formed by the leading beam, and that the data is recorded in the groove tracks GT which are located on the both edge sides of the spot formed by the following beam. In other words, the grating element 12 is rotated by the predetermined angle in the predetermined direction such that the situation is maintained that the center of the spot formed by each of the leading beam and the following beam is formed in substantially the center of the land track LT, that the data is not recorded in the groove tracks GT which are located on the both edge sides of the spot formed by the leading beam, and that the data is recorded in the groove tracks GT which are located on the both edge sides of the spot formed by the following beam, if the center of the spot formed by the main beam is not shifted from substantially the center of the groove track GT. Moreover, in other words, the grating element 12 is rotated by the predetermined angle in the predetermined direction so as to maximize the amplitude of the tracking error signal f the center of the spot formed by the main beam is not shifted from substantially the center of the groove track GT.

On the other hand, FIG. 6(c) shows an aspect in which the data is recorded on the optical disc 100 with a track pitch Tp of about 1.6 μm (specifically, e.g. a CD or the like). In this case, since the grating element 12 is rotated by the predetermined angle, an angle at which the line that connects the two sub beams crosses the travelling direction of the main beam is θ3 (θ3>θ2>θ1). Therefore, if the center of the spot formed by the main beam is not shifted from substantially the center of the groove track GT, the center of the spot formed by each of the leading beam and the following beam is formed in substantially the center of the land track LT. Moreover, the situation is maintained that the data is not recorded in the groove tracks GT which are located on the both edge sides of the spot formed by the leading beam, and that the data is recorded in the groove tracks GT which are located on the both edge sides of the spot formed by the following beam. In other words, the grating element 12 is rotated by the predetermined angle in the predetermined direction such that the situation is maintained that the center of the spot formed by each of the leading beam and the following beam is formed in substantially the center of the land track LT, that the data is not recorded in the groove tracks GT which are located on the both edge sides of the spot formed by the leading beam, and that the data is recorded in the groove tracks GT which are located on the both edge sides of the spot formed by the following beam, if the center of the spot formed by the main beam is not shifted from substantially the center of the groove track GT. Moreover, in other words, the grating element 12 is rotated by the predetermined angle in the predetermined direction so as to maximize the amplitude of the tracking error signal f the center of the spot formed by the main beam is not shifted from substantially the center of the groove track GT.

Now, consideration is given to the case that the grating element 12 is not rotated. If the grating element 12 is not rotated, there is no change in the position of the spot formed by each of the leading beam and the following beam (specifically, the interval between the sub beam and the main beam, the angle at which the line that connects the two sub beams crosses the traveling direction of the main beam, or the like). Therefore, in the case that the data is recorded onto the DVD and the CD, the leading beam forms the spot on the inner circumferential side of the spot position shown in FIG. 6(b) and FIG. 6(c). On the other hand, in the case that the data is recorded onto the DVD and the CD, the following beam forms the spot on the outer circumferential side of the spot position shown in FIG. 6(b) and FIG. 6(c). Thus, even if the center of the spot formed by the main beam is not shifted from substantially the center of the groove track GT, the center of the spot formed by each of the leading beam and the following beam is formed shifted from substantially the center of the land track LT. Thus, the amounts of the reflected light or the like in the right portion and the left portion of the spot formed by the leading beam are different from each other, and the amounts of reflected light or the like in the right portion and the left portion of the spot formed by the following beam are different from each other. Thus, in the case that the grating element 12 is not rotated, even if there is no tracking shift, it can be recognized as if there were the tracking shift. As a result, there is such a disadvantage that the incorrect tracking process can be performed on the basis of the incorrect tracking servo control signal.

According to the recording/reproducing apparatus 1 in the first embodiment, however, the spot position of the sub beam is changed by rotating the grating element 12, in accordance with the type of the optical disc 100 on which the data is recorded (in this case, specifically, the track pitch Tp, or the wavelength of the beam). Thus, even if the type of the optical disc 100 on which the data is recorded is changed, if the center of the spot formed by the main beam is not shifted from substantially the center of the groove track GT, the center of the spot formed by each of the leading beam and the following beam is formed in substantially the center of the land track LT. Moreover, the situation is maintained that the data is not recorded in the groove tracks GT which are located on the both edge sides of the spot formed by the leading beam, and that the data is recorded in the groove tracks GT which are located on the both edge sides of the spot formed by the following beam. In other words, the tracking process is preferably performed by using the three-beam tracking method, on the plurality of types of optical discs 100.

Moreover, it is unnecessary to prepare for a plurality of grating elements 12, in response to the type of the optical disc 100. Thus, it is possible to significantly simplify the structure of the recording/reproducing apparatus 1.

Now, with reference to FIG. 7, specific structures to rotate the grating element 12 are explained. FIG. 7 are plan views conceptually showing the specific structures to rotate the grating element 12.

As shown in FIG. 7(a), the grating driving circuit 42 is provided with: an electromagnet 421 for generating a magnetic field by applying an electric current; a magnet 422 fixed on the grating element 12; and a member having elasticity, such as a spring and a rubber, which is fixed on the magnet 422 and the main body of the pickup 10.

The electromagnet 421 is supplied with the identification signal S43 from the disc identification circuit 43. In accordance with the identification signal S43, the electric current, which is supplied to a coil of the electromagnet 421, is controlled to be On and Off. If the electric current is On, a magnetic field is generated on the electromagnet 421. On the other hand, if the electric current is Off, a magnetic field is not generated on the electromagnet 421. Therefore, if the data is recorded onto a Blu-ray Disc, which constitutes one specific example of the optical disc 100, setting the electric current Off allows each of the main beam and the sub beams to form the spot on the recording surface, as shown in FIG. 6(a), without the rotation of the grating element 12 (i.e. in an initial state) as shown in FIG. 7(a). On the other hand, if the data is recorded onto a DVD, a CD, or the like, which constitutes one specific example of the optical disc 100, turning on the electric current allows the electromagnet 421 to generate a magnetic field, to thereby exert an attractive force with the magnet 422. As a result, as shown in FIG. 7(b), the electromagnet 421 and the magnet 422 are attached to each other, the grating element 12 is rotated by the predetermined angle, and each of the main beam and the sub beams forms the spot on the recording surface, as shown in FIG. 6(b) or FIG. 6(c). At this time, by adjusting the extent of the electric current supplied to the coil, the extent of the attractive force may be controlled, to thereby control the extent of the angle at which the grating element 12 is rotated. If the data is recorded again onto a Blu-ray Disc after the data is recorded onto a CD, a DVD, or the like, the electromagnet 421 and the magnet 422 are detached, and it returns to the state of FIG. 6(a) due to the elastic force of an elastic body 423, by turning off the electric current supplied to the coil. As described above, by using the electromagnet or the like, the grating element 12 can be rotated by the predetermined angle, relatively easily.

Incidentally, instead of turning on/off the electric current supplied to the coil, the direction of the electric current supplied to the coil may be changed to exert the attractive force or repulsive force with the magnet 422.

Alternatively, instead of physically changing a slit angle, as shown in FIG. 7, the grating element 12 including a liquid crystal element (hereinafter referred to a "LC grating element 12a", as occasion demands) may be used to electrically change the slit angle (or slit arrangement, or the like), as shown in FIG. 8. FIG. 8 are plan views conceptually showing the structure of the grating element including a liquid crystal element.

As shown in FIG. 8(a), the LC grating element 12a may be used, which is provided with: a plurality of first electrodes 121; a plurality of second electrodes 122, formed in a different direction from that of the first electrodes 121; and a plurality of third electrodes 123, formed in a different direction from those of the first electrodes 121 and the second electrode 122. For example, if the data is recorded onto a Blu-ray Disc, the slits are formed in accordance with the pattern of the first electrodes 121 by applying a voltage to the liquid crystal element by using the first electrodes 121. Moreover, if the data is recorded onto a DVD, the slits are formed in accordance with the pattern of the second electrodes 122 by applying a voltage to the liquid crystal element by using the second electrodes 122. Moreover, if the data is recorded onto a CD, the slits are formed in accordance with the pattern of the third electrodes 123 by applying a voltage to the liquid crystal element by using the third electrodes 123. That is, if the electrodes used in applying a voltage to the liquid crystal element are changed (i.e. if the electrodes for supplying the electric current for driving the liquid crystal element are changed), it is possible to change the slit angle of the LC grating element 12a, relatively easily.

In such a LC grating element 12a, as shown in FIG. 8(b), the first electrodes 121, the second electrodes 122, the third electrodes 123, insulating layers 124, a liquid crystal element 125, and an other-edge electrode 126 are laminated in this order. Each of the first electrodes 121, the second electrodes 122, and the third electrodes 123 are patterned, as shown in FIG. 8(a), and the insulating layers 124 are formed between the first electrodes 121 and the second electrodes 122 and between the second electrodes 122 and the third electrodes 123. Thus, each of the first electrodes 121, the second electrodes 122, and the third electrodes 123 does not interference with or short-circuit each other. Therefore, it is possible to realize the LC grating element 12a, used for the recording/reproducing apparatus 1 in the first embodiment, relatively easily. Alternatively, the LC grating element in which three LC grating elements are laminated may be used as the LC grating element 12a used for the recording/reproducing apparatus 1 in the first embodiment.

Incidentally, the aforementioned first embodiment illustrates the aspect that the grating element 12 is rotated by the predetermined angle if the data is recorded onto a CD and a DVD, which constitute one specific example of the optical disc 100. However, it is obvious that the type of the optical disc 100 may be changed on which the grating element 12 is to be rotated by the predetermined angle, if necessary. The point is that any type of optical disc 100 can be used on which the grating element 12 is rotated, as long as the preferable tracking process can be performed, as described above.

SECOND EMBODIMENT OF RECORDING/REPRODUCING APPARATUS

Next, with reference to FIG. 9 to FIG. 13, an explanation will be given on a recording/reproducing apparatus as a second embodiment of the recording apparatus of the present invention. Incidentally, the same constituent elements or operation steps as those in the first embodiment carry the same numerical references or step numbers, and the detailed explanation thereof will be omitted.

(1) Basic Structure

Firstly, with reference to FIG. 9, the structure of a recording/reproducing apparatus 3 in the second embodiment will be discussed. FIG. 9 is a block diagram conceptually showing the basic structure of the recording/reproducing apparatus 3 in the second embodiment.

As shown in FIG. 9, the recording/reproducing apparatus 3 in the second embodiment is provided with: an optical pickup 10b; a signal processing device 21; a laser driving circuit 22; a reproduction device 30; a three-beam tracking servo circuit 41; a grating driving circuit 42b; a disc identification circuit 43; a tracking driving circuit 44; a focus servo circuit 51; a focus driving circuit 52; a control device 60; and a spindle motor 70.

In the second embodiment, particularly, a grating element 12b included in the optical pickup 10b constitutes one specific example of the "diffracting device" of the present invention. And the grating element 12b is adapted to change the slit interval, arbitrarily or in accordance with a predetermined rule.

The grating driving circuit 42b constitutes one specific example of the "controlling device" of the present invention with the control device 60. And the grating driving circuit 42b changes the slit interval of the grating element 12b, under the control of the control device 60 on the basis of the identification signal S43 supplied from the disc identification circuit 43. The change process of the slit interval of the grating element 12b will be detailed later (refer to FIG. 10 or the like)

(2) Operation Principle

Next, with reference to FIG. 10 and FIG. 11, an explanation will be given on the operation principle of the recording/reproducing apparatus 3 in the second embodiment (in particular, the recording operation). In particular, here, the explanation will be given by focusing on the change in the slit interval of the grating element 12b. FIG. 10 are plan views conceptually showing the slits of the grating element. FIG. 11 are plan views conceptually showing the aspect of focusing the light beam B on the optical disc 100 if the slit interval of the grating element 12b is changed.

As shown in FIG. 10(a), it is assumed that the slit interval of the grating element 12b is d1 when the data is recorded onto a CD, which constitutes one specific example of the optical disc 100. In the aspect of focusing the light beam B on the optical disc 100 at this time, if the center of the spot formed by the main beam is not shifted from substantially the center of the groove track GT, as shown in FIG. 11(a), the center of the spot formed by each of the leading beam and the following beam is formed in substantially the center of the land track LT.

On the other hand, as shown in FIG. 10(b), when the data is recorded onto a DVD, which constitutes one specific example of the optical disc 100, the slit interval of the grating element 12b is changed from d1 to d2. That is, as compared to the case that the data is recorded onto a CD, the slit interval is reduced. In the aspect of focusing the light beam B on the optical disc 100 at this time, the leading beam forms the spot on the further inner circumferential side, and the following beam forms the spot on the further outer circumferential side, as shown in solid lines in FIG. 11(b). However, this is merely the change in the slit interval of the grating element 12b, so that the angle at which the line that connects the two sub beams crosses the travelling direction of the main beam is the same as the case in FIG. 11(a).

At this time, if the center of the spot formed by the main beam is not shifted from substantially the center of the groove track GT, the slit interval of the grating element 12b is changed so as to maintain the situation that the center of the spot formed by each of the leading beam and the following beam is formed in substantially the center of the land track LT.

Now, the slit interval will be explained with reference to FIG. 12. FIG. 12 is an outline view showing the emission of the light beam B if the data is being recorded onto the optical disc 100, observed in a direction of crossing the travelling direction of the light beam B.

As shown in FIG. 12, $\sin \theta = \lambda/d$ holds true under the assumption that the angle between the traveling direction of the main beam and the traveling direction of the sub beams, which are generated on the grating element 12b, is $\theta$, the slit interval of the grating element 12b is d, and the wavelength of the light beam B is $\lambda$. On the other hand, an interval i on the optical disc 100 between the center of the spot formed by the main beam and the center of the spot formed by the sub beam is determined by a distance t between the surface of the optical disc 100 and the recording layer 103 (i.e. the thickness of the substrate 101b), $\theta$ and a refractive index n of the substrate 101b. On the other hand, the interval i on the optical disc 100 between the center of the spot formed by the main beam and the center of the spot formed by the sub beam is determined by the track pitch Tp. In conclusion, the track pitch Tp determines the interval i on the optical disc 100 between the center of the spot formed by the main beam and the center of the spot formed by the sub beam. Then, the thickness t and the refractive index n of the substrate 101b and the wavelength $\lambda$ of the light beam B can determine the appropriate slit interval d.

Therefore, the recording/reproducing apparatus 3 in the second embodiment changes the slit interval of the grating element 12b so as to maintain the situation that the center of the spot formed by each of the leading beam and the following beam is formed in substantially the center of the land track LT if the center of the spot formed by the main beam is not shifted from substantially the center of the groove track GT, in view of each of the relationships in FIG. 12. In other words, the recording/reproducing apparatus 3 in the second embodiment changes the slit interval of the grating element 12b so as to maximize the amplitude of the tracking error signal, in view of each of the relationships in FIG. 12. By this, as in the recording/reproducing apparatus 1 in the first embodiment, it is possible to appropriately perform the tracking process using the three-beam tracking method, on the plurality of types of optical discs 100.

Incidentally, in the second embodiment, a LC grating element 12d shown in FIG. 13 is preferably used as the grating element 12b. That is, specifically, the LC grating element 12d is preferably used, which is provided with: first electrodes 121b which can realize the preferable slit for recording the data onto a CD; second electrodes 121b which can realize the preferable slit interval for recording the data onto a DVD; and third electrodes 123 which can realize the preferable slit interval for recording the data onto a Blu-ray Disc.

THIRD EMBODIMENT OF RECORDING/REPRODUCING APPARATUS

Next, with reference to FIG. 14, an explanation will be given on a recording/reproducing apparatus as a third embodiment of the recording apparatus of the present invention. FIG. 14 is a block diagram conceptually showing the basic structure of a recording/reproducing apparatus 4 in the third embodiment. Incidentally, the same constituent elements or operation steps as those in the first or second embodiment carry the same numerical references or step numbers, and the detailed explanation thereof will be omitted.

As shown in FIG. 14, the recording/reproducing apparatus 4 in the third embodiment is provided with: an optical pickup 10c; a signal processing device 21; a laser driving circuit 22; a reproduction device 30; a three-beam tracking servo circuit 41; a disc identification circuit 43; a tracking driving circuit 44; a focus servo circuit 51; a focus driving circuit 52; a control device 60; and a spindle motor 70.

In the recording/reproducing apparatus 4 in the third embodiment, particularly, the optical pickup 10c is provided with an acoustooptic element 12c to which a transducer 121c, which constitutes one specific example of the "propagating device" of the present invention, is attached, instead of the grating element. The acoustooptic element includes an optical crystal, such as tellurium dioxide (TeO2) and lead molybdate (PbMoO4). Moreover, as the transducer, for example, a lithium niobate (LiNbO3) piezoelectric thin film or the like is listed as one specific example.

Moreover, the recording/reproducing apparatus 4 is provided with an acoustooptic element ultrasound frequency drive circuit 45, which constitutes one specific example of the "frequency changing device" of the present invention. The acoustooptic element ultrasound frequency drive circuit 45 propagates ultrasound into the acoustooptic element 12c through the transducer 121c. In particular, the acoustooptic element ultrasound frequency drive circuit 45 is adapted to arbitrarily set the frequency of the propagated ultrasound.

If ultrasound is propagated into the acoustooptic element 12c, an acoustooptic effect causes the situation that the distribution of the refractive index has a variation (or a periodical dense/light distribution of the refractive index), in the acoustooptic element 12c. If the light beam B enters the acoustooptic element 12c in the situation that the refractive index is dense, the light beam B is diffracted, and for example, the main beam (or zero-order light) and the two sub beams (or first-order light) are generated. This indicates that the acoustooptic element 12c has the same function as that of the grating element that has many slits.

At this time, the interval in the density of the refractive index is changed by changing the frequency of the propagated ultrasound. Therefore, it is possible to realize substantially the same situation as that the slit interval of the grating element is changed. That is, the recording/reproducing apparatus 4 in the third embodiment can perform the same operation as that of the recording/reproducing apparatus 3 in the second embodiment. By this, the recording/reproducing apparatus 4 in the third embodiment can also appropriately perform the tracking process using the three-beam tracking method, on the plurality of types of optical discs 100.

(Specific Structure of Light Receiving Element)

Next, with reference to FIG. 15, an explanation will be given on an aspect in which the light receiving element on the hologram laser 11 receives the reflected light of the light beam B. FIG. 15 are cross sectional views conceptually showing the aspect in which the light receiving element on the hologram laser 11 receives reflected light of the light beam B.

In the aforementioned first to third embodiments, the optical path of the sub beam is changed depending on the type of the optical disc 100. In other words, the position on the optical disc of the spot formed by the sub beam is changed. For example, in the first embodiment, the spot formed by the sub beam is rotated, with the spot formed by the main beam being centered. In the second and third embodiments, the spot formed by the sub beam gets closer to or farther from the spot formed by the main beam. Thus, when the reflected light of the sub beam is received on the hologram laser 11, there are the following technical problems.

As shown in FIG. 15(*a*), the reflected light of the main beam and the reflected light of the two sub beams are originally focused on the light receiving element (or photo detector: PD) on the hologram laser 11. Specifically, the main beam is focused on the PD for main beam, and each of the two sub beams is focused on respective one of the PDs for sub beam.

At this time, the optical path of the sub beam is changed by rotating the grating element 12 or by changing the slit interval of the grating element 12c. Therefore, as shown in FIG. 15(*b*), the optical path of the reflected light is naturally changed, which does not allow each of the two sub beams to be focused on respective one of the PDs for sub beam. This causes such a technical problem that it is hard or impossible to preferably generate the tracking servo control signal or the like, and as a result, it is hard or impossible to preferably perform the tracking process.

Therefore, in the aforementioned first to third embodiments, the following approaches are preferably taken, which will be explained with reference to FIG. 16 to FIG. 20. FIG. 16 is a plan view conceptually showing a first aspect of a light receiving surface of the PD. FIG. 17 is a plan view conceptually showing a second aspect of the light receiving surface of the PD. FIG. 18 are cross sectional views conceptually showing that the reflected light is focused on the PD shown in FIG. 17. FIG. 19 are cross sectional views conceptually showing a third aspect of the light receiving surface of the PD. FIG. 20 are cross sectional views conceptually showing a fourth aspect of the light receiving surface of the PD.

As shown in FIG. 16, the light receiving surface of the PD for sub beam may have long sides in the displacement direction of a position on which the reflected light of the sub beam is focused. That is, the light receiving surface of the PD for sub beam may have such a size that the reflected light of the sub beam can be focused even if the position on which the reflected light of the sub beam is displaced. At this time, the direction of the division of the PD for sub beam is the same as the displacement direction of the position on which the reflected light of the sub beam is focused. That is, even if the position on which the reflected light of the sub beam is focused is changed due to the rotation of the grating element 12 or the like, the PD for sub beam is divided with respect to the travelling direction of the main beam so as to receive each of the right portion of the reflected light and the left portion of the reflected light.

By the recording/reproducing apparatus provided with the PD having such a structure, even if the position on which the spot formed by the sub beam is focused is changed, the reflected light can be preferably received. As a result, it is possible to preferably perform the tracking process.

As shown in FIG. 17, an element 111 which can change the refractive index if necessary (hereinafter referred to as a "refractive index changing element", as occasion demands) may be disposed on each PD. The refractive index of the refractive index changing element 111 is changed to be the refractive index that allows the reflected light of the sub beam to be focused on the PD, under the control of the control device 60. The refractive index may be changed in accordance with the optical path of the sub beam of the angle of the sub beam (e.g. the angle of the travelling direction of the sub beam with respect to the travelling direction of the main beam), or in accordance with the type of the optical disc 100 on which the data is recorded, or in accordance with the slit interval of the grating element 12. In any cases, the reflected light of the sub beam is focused on the PD by changing the refractive index of the refractive index changing element 111, as occasion demands.

Specifically, as shown in FIG. 18(*a*), if the angle between the reflected light of the main beam and the reflected light of the sub beam is x1, the reflected light of each of the main beam and the sub beam is focused on respective one of the PDs.

On the other hand, if the optical path of the sub beam or the like is changed due to the rotation of the grating element 12 or the like, the optical path of the reflected light of the sub beam is also changed, as shown in FIG. 18(*b*). Specifically, the angle of the traveling direction of the reflected light of each of the sub beams with respect to the traveling direction of the reflected light of the main beam is changed from x1 to x2. At this time, if the refractive index of the refractive index changing element 111 is not changed, the reflected light of the sub beam is not focused on the PD for sub beam, as shown in a thick dashed line. Thus, if the optical path of the sub beam or the like is changed, the refractive index of the refractive index changing element 111 is changed such that the reflected light of the sub beam is focused on the PD for sub beam, as shown in a thick solid line.

As described above, by changing the refractive index of the refractive index changing element 111 as occasion demands, even if the optical path of the sub beam or the like is changed, the reflective light can be preferably received, and as a result, the tracking process can be preferably performed.

Incidentally, the refractive index changing element 111 shown in FIG. 17 and FIG. 18 can effectively change the optical path of the reflected light if the reflected light of the sub beam entering the refractive index changing element 111 has a relatively large incident angle. However, if the incident angle is relatively small, the optical path of the reflected light cannot be effectively changed. For example, as the incident angle of the reflected light is getting closer to 0 degrees, the optical path is not changed much or is hardly changed even if the refractive index of the refractive index changing element 111 is changed. In case of such a situation, as shown in FIG. 19(a) and FIG. 19(b), the refractive index changing element 111 preferably has such a shape that the reflected light of the sub beam entering the refractive index changing element 111 has a relatively large incident angle.

Moreover, as shown in FIG. 20(a), in addition to or instead of providing the refractive index changing element 111 on each PD, the common refractive index changing element 111 may be provided for all the PDs. Even in this case, as shown in FIG. 20(b), the optical path of the reflected light of the sub beam is changed in the refractive index changing element 111 whose refractive index is preferably changed. By this, the reflected light of the sub beam is focused on the PD even if the angle of the sub beam is changed.

Incidentally, in addition to or instead of providing the refractive index changing element 111, the refractive index of the objective lens 13 itself may be able to be changed, as occasion demands.

Incidentally, the present invention is not limited to a CD, a DVD, and a Blu-ray Disc described above, and it can be also applied to other various optical discs. Moreover, it is not limited to a single-layer type optical disc, and it can be applied to a dual-layer type optical disc and a multilayer type optical disc having three or more layers. Moreover, if the present invention is applied to the dual-layer type or multilayer type optical disc, each recording layer does not necessarily have the same track pitch Tp (or the same recording capacity). For example, as shown in FIG. 21, it can be applied to an optical disc 100a on which a first recording layer L0 has a track pitch Tp of about 1.6 μm, a second recording layer L1 has a track pitch Tp of about 0.74 μm, and a third recording layer L2 has a track pitch Tp of about 0.32 μm to 0.35 μm.

Moreover, in the aforementioned embodiments, the optical disc 100 is explained as one example of the recording medium, and the recorder or player related to the optical disc 100 is explained as one example of the recording apparatus. The present invention, however, is not limited to the optical disc and the recorder thereof, and can be applied to other various recording media, and the recorders or player thereof, which support high density recording or high transfer rate.

The present invention is not limited to the aforementioned embodiments, and various changes may be made, if desired, without departing from the essence or spirit of the invention which can be read from the claims and the entire specification. A recording apparatus and method, and a computer program for recording control, which involve such changes, are also intended to be within the technical scope of the present invention.

INDUSTRIAL APPLICABILITY

The recording apparatus and the recording method, and the computer program according to the present invention can be applied to a recording apparatus, such as a DVD recorder. Moreover, they can be applied to a recording apparatus or the like, which is mounted on or can be connected to various computer equipment for consumer use or business use, for example.

The invention claimed is:

1. A recording apparatus comprising:
   a recording device for recording data onto each of a plurality of types of recording media by irradiating a light beam corresponding to each of the types of recording media;
   a diffracting device, which is disposed on an optical path of the light beam from said recording device to the recording medium, for generating a main beam and a plurality of sub beams by making the optical beam diffract, the main beam being used to record the data and perform a tracking process, the sub beams being used to perform the tracking process, an amplitude of a tracking signal which is generated by each or one portion of the sub beams and by the main beam being maximum;
   a controlling device for controlling said diffracting device to adjust a position on which each of the plurality of sub beams is focused, in accordance with the type of the recording medium;
   a tracking device for performing the tracking process by using the tracking signal;
   a plurality of light receiving devices for receiving reflected light of at least one portion of the plurality of sub beams and the main beam; and
   a refractive index changing device, which is provided on a light receiving surface of a light receiving device which receives at least one portion of the plurality of sub beams from among said plurality of light receiving devices, for changing a refractive index.

2. The recording apparatus according to claim 1, wherein said controlling device controls said diffracting device to adjust the position on which each of the plurality of sub beams is focused by rotating the position on which each of the plurality of sub beams with a spot of the main beam being centered.

3. The recording apparatus according to claim 2, wherein said controlling device controls said diffracting device to rotate the position on which each of the plurality of sub beams is focused, in accordance with a track pitch of a concentric or spiral recording track, which is formed on the recording medium and which is used to record the data.

4. The recording apparatus according to claim 2, wherein said controlling device controls said diffracting device to rotate said diffracting device by a predetermined angle, with an irradiation direction of the light beam being a rotational axis and with a position on which the main beam is focused being a center point.

5. The recording apparatus according to claim 4, further comprising:
   an elastic body;
   a magnetic device connected to each of said elastic body and said diffracting device; and
   an electromagnet for applying a magnetic field to said magnetic device,
   said controlling device rotating said diffracting device by the predetermined angle by applying or not applying an electric current to said electromagnet.

6. The recording apparatus according to claim 2, wherein said diffracting device includes a liquid crystal element, and
   said controlling device controls a voltage application pattern to the liquid crystal element.

7. The recording apparatus according to claim 2, wherein
a concentric or spiral recording track which is used to record the data is formed on the recording medium, and
said controlling device controls said diffracting device such that the recording track in which the data is already recorded is disposed in both edge portions of a spot on which one of the plurality of sub beams is focused, and such that the recording track in which the data is unrecorded is disposed in both edge portions of a spot on which another one of the plurality of sub beams is focused.

8. The recording apparatus according to claim 1, wherein
said diffracting device comprises diffraction grating, and
said controlling device controls said diffracting device to change a grating interval of the diffraction grating.

9. The recording apparatus according to claim 8, wherein said controlling device controls said diffracting device to change the grating interval in accordance with a track pitch of a concentric or spiral recording track, which is formed on the recording medium and which is used to record the data.

10. The recording apparatus according to claim 8, wherein
a concentric or spiral recording track for recording the data is formed on the recording medium, and
said controlling device controls said diffracting device such that the recording track in which the data is already recorded is disposed in both edge portions of a spot on which one of the plurality of sub beams is focused, and such that the recording track in which the data is unrecorded is disposed in both edge portions of a spot on which another one of the plurality of sub beams is focused.

11. The recording apparatus according to claim 8, wherein
said diffracting device includes a liquid crystal element, and
said controlling device controls a voltage application pattern to the liquid crystal element.

12. The recording apparatus according to claim 8, wherein
said diffracting device includes an acoustooptic element which realizes an acoustooptic effect, and
said controlling device further comprises: a propagating device for propagating ultrasound with a predetermined frequency into the acoustooptic element; and a frequency changing device for changing the frequency of the ultrasound.

13. The recording apparatus according to claim 12, wherein the frequency changing device changes the frequency in accordance with a track pitch of a concentric or spiral recording track, which is formed on the recording medium and which is used to record the data.

14. The recording apparatus according to claim 1, further comprising a light receiving device for receiving reflected light of at least one portion of the plurality of sub beams and the main beam,
a light receiving surface, which receives the reflected light of at least one portion of the plurality of sub beams, of said light receiving device being divided in a direction toward which the position on which each of the plurality of sub beams is focused displaces.

15. The recording apparatus according to claim 1, wherein the refractive index changing device has such a shape that an incident angle of the reflected light of at least one portion of the plurality of sub beams with respect to the refractive index changing device is greater than an incident angle of the reflected light of at least one portion of the plurality of sub beams with respect to said light receiving device.

16. The recording apparatus according to claim 1, wherein the recording medium comprises a plurality of recording layers which respectively have different track pitches of concentric or spiral recording tracks which are used to record the data or which respectively have different recording capacities for the data.

17. The recording apparatus according to claim 1, wherein said recording device irradiates the light beam with different wavelength, in accordance with a track pitch of a concentric or spiral recording track which is used to record the data or a recording capacity for the data of the recording medium.

18. A recording method on a recording apparatus comprising: a recording device for recording data onto each of a plurality of types of recording media by irradiating a light beam corresponding to each of the types of recording media, said recording method comprising:
a diffracting process of generating a main beam and a plurality of sub beams by making the optical beam diffract, the main beam being used to record the data and perform a tracking process, the sub beams being used to perform the tracking process, an amplitude of a tracking signal which is generated by each or one portion of the sub beams and by the main beam being maximum;
a controlling process of controlling said diffracting device to adjust a position on which each of the plurality of sub beams is focused, in accordance with the type of the recording medium;
a tracking process of performing the tracking process by using the tracking signal; and
a light receiving process of receiving reflected light on a plurality of light receiving devices for receiving the reflected light of at least one portion of the plurality of sub beams and the main beam,
a light receiving surface of a light receiving device which receives at least one portion of the plurality of sub beams from among said plurality of light receiving devices comprising a refractive index changing device for changing a refractive index.

19. A computer-readable medium having recorded thereon in a non-transitory state a computer program executable by a computer provided in the recording apparatus according to claim 1, the computer program making a computer function as at least one portion of the recording apparatus.

* * * * *